(12) United States Patent
Xin et al.

(10) Patent No.: US 12,348,333 B2
(45) Date of Patent: Jul. 1, 2025

(54) METHOD FOR ADVERTISING BIT ERROR AND RELATED DEVICES

(71) Applicant: Huawei Technologies Co., Ltd., Shenzhen (CN)

(72) Inventors: Fang Xin, Nanjing (CN); Da Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 673 days.

(21) Appl. No.: 17/546,404

(22) Filed: Dec. 9, 2021

(65) Prior Publication Data

US 2022/0103312 A1 Mar. 31, 2022

Related U.S. Application Data

(63) Continuation of application No. PCT/CN2020/095481, filed on Jun. 10, 2020.

(30) Foreign Application Priority Data

Jun. 10, 2019 (CN) .................. 201910499061.X

(51) Int. Cl.
*H04L 12/00* (2006.01)
*H04L 1/20* (2006.01)
(Continued)

(52) U.S. Cl.
CPC .......... *H04L 12/4633* (2013.01); *H04L 1/203* (2013.01); *H04L 45/22* (2013.01); *H04L 45/28* (2013.01)

(58) Field of Classification Search
None
See application file for complete search history.

(56) References Cited

U.S. PATENT DOCUMENTS 7,107,498 B1 * 9/2006 Schmidt .................. H04L 1/203
714/704
10,038,494 B1 7/2018 Paraschis et al.
(Continued)

FOREIGN PATENT DOCUMENTS

CN 102870490 A 1/2013
CN 104518914 A 4/2015
(Continued)

OTHER PUBLICATIONS

Xu Mingwei, et al., "Lightweight virtual-link state detection protocol," Tsinghua Univ (SciandTech), 2011, vol. 51, No. 11, 5 pages.
(Continued)

*Primary Examiner* — Abdelillah Elmejjarmi
(74) *Attorney, Agent, or Firm* — Conley Rose, P.C.

(57) ABSTRACT

A method for advertising a bit error includes that an intermediate node in a first tunnel detects that a bit error rate of a packet sent through the first tunnel exceeds a threshold; and the intermediate node sends a first packet to an egress node in the first tunnel through the first tunnel, where the first packet indicates that a bit error has occurred in the first tunnel, the first packet further instructs the egress node to send a second packet to an ingress node in the first tunnel, and the second packet indicates that the bit error has occurred in the first tunnel. The foregoing method can be used to transfer bit error information, so as to implement associated protection switching of services.

20 Claims, 9 Drawing Sheets

| 3 bits | 5 bits | 2 bits | 1 bit | 1 bit | 1 bit | 1 bit | 1 bit | 1 bit | 8 bits | 8 bits |
|---|---|---|---|---|---|---|---|---|---|---|
| Version | Diagnostic | State | Poll | Final | Control Plane Independent | Authentication Present | Demand | Multipoint | Detect Mult | Length |
| My Discriminator ||||||||||||
| Your Discriminator ||||||||||||
| Desired Min Tx Interval ||||||||||||
| Required Min Rx Interval ||||||||||||
| Required Min Echo Rx Interval ||||||||||||

(51) Int. Cl.
*H04L 12/46* (2006.01)
*H04L 45/00* (2022.01)
*H04L 45/28* (2022.01)

(56) References Cited

U.S. PATENT DOCUMENTS

| | | | |
|---|---|---|---|
| 2013/0329726 A1* | 12/2013 | Li | H04L 12/4633 370/389 |
| 2015/0110133 A1 | 4/2015 | Zhou et al. | |
| 2016/0020922 A1 | 1/2016 | Sung et al. | |
| 2016/0119089 A1* | 4/2016 | Zhang | H04L 43/0823 370/328 |
| 2016/0365989 A1 | 12/2016 | Herrero | |
| 2017/0302567 A1* | 10/2017 | Lan | G06F 11/0793 |
| 2020/0036576 A1* | 1/2020 | Fan | H04L 43/0817 |

FOREIGN PATENT DOCUMENTS

| | | |
|---|---|---|
| CN | 104521193 A | 4/2015 |
| CN | 104734865 A | 6/2015 |
| CN | 105281931 A | 1/2016 |
| CN | 105471736 A | 4/2016 |
| CN | 105765909 A | 7/2016 |
| CN | 108989120 A | 12/2018 |
| CN | 109150761 A | 1/2019 |
| EP | 3190753 A1 | 7/2017 |
| EP | 3229393 A1 | 10/2017 |
| KR | 20150052761 A | 5/2015 |
| WO | 2016106482 A1 | 7/2016 |

OTHER PUBLICATIONS

Xu Huazhong, et al., "Research on the Implementation of Mobile IP Tunneling Technology," Jan. 10, 2008, 4 pages.
D. Katz, et al.,"Bidirectional Forwarding Detection (BFD)," RFC 5880, Jun. 2010, 49 pages.
R. Aggarwal, et al., "Bidirectional Forwarding Detection (BFD) for MPLS Label Switched Paths (LSPs)," RFC 5884, Jun. 2010, 12 pages.

* cited by examiner

| 3 bits | 5 bits | 2 bits | 1 bit | 1 bit | 1 bit | 1 bit | 1 bit | 1 bit | 8 bits | 8 bits |
|---|---|---|---|---|---|---|---|---|---|---|
| Version | Diagnostic | State | Poll | Final | Control Plane Independent | Authentication Present | Demand | Multipoint | Detect Mult | Length |
| My Discriminator ||||||||||||
| Your Discriminator ||||||||||||
| Desired Min Tx Interval ||||||||||||
| Required Min Rx Interval ||||||||||||
| Required Min Echo Rx Interval ||||||||||||

FIG. 1

METHOD FOR ADVERTISING BIT ERROR AND RELATED DEVICES

CROSS-REFERENCE TO RELATED APPLICATIONS

This is a continuation of Int'l Patent App. No. PCT/CN2020/095481 filed on Jun. 10, 2020, which claims priority to Chinese Patent App. No. 201910499061.X filed on Jun. 10, 2019, both of which are incorporated by reference.

TECHNICAL FIELD

This application relates to the field of network communication technologies, and in particular, to a method for advertising a bit error and related devices.

BACKGROUND

Bit error means that a bit error occurs on a signal during transmission from sending of the signal to reception of the signal. Generally, a communication device detects, according to a cyclic redundancy check (CRC) algorithm, that an error occurs on a data packet. Bit errors caused by optical fiber faults can be eliminated by rectifying the faults, but occasional bit errors caused by factors such as optical path jitter and optical fiber aging are difficult to eliminate. Occasional packet loss caused by these factors may cause a base station to go out of service (that is, the base station goes offline or goes out of management) and may cause data traffic lost.

A Bidirectional Forwarding Detection (BFD) protocol is used for end-to-end link detection. The BFD protocol is a protocol independent of routing protocols, and can implement quick detection at a millisecond level. During detection, two ends first create a session through negotiation, the two ends periodically send BFD packets to each other after creating (up) the session and detect a link through which the BFD packets are exchanged, and if one end does not receive a BFD packet from the peer end within a period of time, a status of the session changes to down, indicating that the link through which the BFD packets pass is faulty. The BFD packets herein are various transmission protocol packets carrying content related to the BFD protocol. In other words, payload parts of these protocol packets carry the content related to the BFD protocol. The two ends each may negotiate a frequency for sending BFD packets to each other, where a higher frequency indicates that a fault can be detected more quickly. In an IPv4 or IPv6 network, a User Datagram Protocol (UDP) encapsulation format or an Internet Protocol (IP) encapsulation format needs to be used for the BFD packet.

A BFD packet or an Intermediate System to Intermediate System (IS-IS) packet is generally used to transfer bit error information. If the BFD packet is used to transfer bit error information, a length of the BFD packet needs to be extended by adding a type-length-value (TLV) field to the tail of the BFD packet. Because a format of the BFD packet is modified if this manner is used, and the transferred BFD packet is not a standard-format BFD packet, interworking with each other is difficult to implement. For example, a peer-end device may be incapable of parsing the BFD packet whose format is modified, and further cannot obtain bit error information carried in the BFD packet. However, if the IS-IS packet is used to transfer bit error information, the bit error information can be transferred only in a layer 2 network. If there are layer 3 devices or a plurality of intermediate devices between ends, the manner of using the IS-IS packet to transfer bit error information is inapplicable. In other words, this manner is applicable only to a scenario in which bit error information is transferred between directly connected devices.

SUMMARY

This application provides a method for transferring bit error information and related devices, to transfer bit error information, and further implement end-to-end associated protection switching of services.

According to a first aspect, a method for advertising a bit error is provided. The method includes that an intermediate node on a first tunnel detects that a bit error rate of a packet sent through the first tunnel exceeds a threshold, and the intermediate node sends a first packet to an egress node on the first tunnel through the first tunnel. The first packet is used to indicate that a bit error occurs on the first tunnel, the first packet is further used to indicate the egress node to send a second packet to an ingress node on the first tunnel, and the second packet is used to indicate that a bit error occurs on the first tunnel.

In the solution provided in this application, the intermediate node on the first tunnel detects the bit error rate of the packet that is sent through the first tunnel. When the bit error rate exceeds the threshold, the intermediate node sends, to the egress node on the first tunnel, the first packet indicating that a bit error occurs on the first tunnel. After receiving the first packet, the egress node sends, to the ingress node on the first tunnel, the second packet used to indicate that a bit error occurs on the first tunnel. In this way, bit error information can be transferred, and further end-to-end associated protection switching of services is implemented.

With reference to the first aspect, in a possible implementation of the first aspect, the first packet includes a label and a bit error flag, the label is used by the egress node to determine the first tunnel, and the bit error flag is used to indicate that a bit error occurs on a tunnel through which the first packet is sent.

In the solution provided in this application, the intermediate node adds the label and the bit error flag to the first packet and sends the first packet to the egress node. After receiving the first packet, the egress node can determine the first tunnel based on the label carried in the first packet, and can determine, based on the bit error flag, that a bit error occurs. The egress node can determine, based on the label together with bit error flag, that a bit error occurs on the first tunnel, so that the egress node can accurately determine that a bit error occurs on the first tunnel.

With reference to the first aspect, in a possible implementation of the first aspect, the first packet is used to indicate the egress node to send the second packet to the ingress node on the first tunnel through a second tunnel, where the second tunnel is a reverse tunnel of the first tunnel.

In the solution provided in this application, the first tunnel and the second tunnel are reverse tunnels of each other. After receiving the first packet sent by the intermediate node, the egress node on the first tunnel needs to send the second packet to the ingress node on the first tunnel through a reverse tunnel of the first tunnel, namely, the second tunnel, to notify the ingress node that a bit error occurs on the first tunnel.

With reference to the first aspect, in a possible implementation of the first aspect, the label is further used by the egress node to determine the second tunnel.

In the solution provided in this application, a path for transferring a packet is determined based on a label. After the egress node on the first tunnel receives the first packet, because the first packet carries the label, the egress node can determine the ingress node on the first tunnel based on the label, and further determine the second tunnel. Because this manner does not depend on IP addresses, packet transmission is more efficient and convenient.

With reference to the first aspect, in a possible implementation of the first aspect, the intermediate node calculates a sum of bit error rates of a packet forwarded through a plurality of paths on the first tunnel, and detects that the sum of the bit error rates exceeds the threshold.

In the solution provided in this application, the intermediate node calculates the sum of the bit error rates of the packet forwarded through the plurality of paths, and then compares the sum with the threshold for determining, to implement transmission of the bit error rates. This can avoid a case in which a bit error rate of each path does not reach the threshold but the sum of the bit error rates exceeds the threshold, so that the intermediate node can accurately send, to the egress node, the first packet indicating that a bit error occurs on the first tunnel, and further the egress node takes corresponding measures to avoid data traffic loss.

With reference to the first aspect, in a possible implementation of the first aspect, the first packet is a BFD packet, the BFD packet includes a diagnostic field, the diagnostic field is used to carry the bit error flag, and a value of the bit error flag is 30.

Optionally, the value of the bit error flag may be another value, for example, 10 or 15, provided that the value ranges from 9 to 31.

In the solution provided in this application, a special value of the diagnostic field in the BFD packet is used to represent the bit error flag. Therefore, another field may not be added or other information may not be sent to carry the bit error flag, and a format of the BFD packet does not need to be modified. This ensures that a packet that is sent is still a standard-format BFD packet, thereby avoiding interworking difficulties, and effectively transferring a bit error status. This implementation is simple and transmission efficiency is improved.

With reference to the first aspect, in a possible implementation of the first aspect, the first packet is a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

In the solution provided in this application, the required min echo rx interval field in the BFD packet is reused to transfer the bit error rate, so that the egress node on the first tunnel can more intuitively obtain the bit error rate from the first packet sent by the intermediate node, without additionally transferring the bit error rate. This reduces transmission resource overheads and improves transmission efficiency.

According to a second aspect, a method for advertising a bit error is provided. This method includes that an egress node on a first tunnel receives a first packet sent by a first intermediate node on the first tunnel through the first tunnel, where the first packet is a packet that is sent to the egress node when the first intermediate node detects that a bit error rate of a packet sent through the first tunnel exceeds a threshold, and the first packet is used to indicate that a bit error occurs on the first tunnel, and the egress node sends a second packet to an ingress node on the first tunnel based on the first packet, where the second packet is used to indicate that a bit error occurs on the first tunnel.

In the solution provided in this application, the egress node on the first tunnel receives the first packet indicating that a bit error occurs on the first tunnel, where the first packet is a packet sent by the intermediate node on the first tunnel to the egress node when the intermediate node detects that the bit error rate of the packet sent through the first tunnel exceeds the threshold. After receiving the first packet, the egress node sends, to the ingress node on the first tunnel, the second packet used to indicate that a bit error occurs on the first tunnel. In this way, bit error information can be transferred, and further end-to-end associated protection switching of services is implemented.

With reference to the second aspect, in a possible implementation of the second aspect, the first packet includes a first label and a first bit error flag, where the first label corresponds to the first tunnel, and the first bit error flag is used to indicate that a bit error occurs on a tunnel through which the first packet is sent. The egress node determines, based on the first label and the first bit error flag, that a bit error occurs on the first tunnel.

With reference to the second aspect, in a possible implementation of the second aspect, the egress node determines a second tunnel based on the first label, and the egress node sends the second packet to the ingress node on the first tunnel through the second tunnel, where the second tunnel is a reverse tunnel of the first tunnel.

With reference to the second aspect, in a possible implementation of the second aspect, the second packet includes a second label and a second bit error flag. The second label is used by the ingress node to determine the first tunnel. The second bit error flag is used to indicate that a bit error occurs on a reverse tunnel of a tunnel through which the second packet is sent.

In the solution provided in this application, the egress node adds the second label and the second bit error flag to the second packet and sends the second packet to the ingress node. After receiving the second packet, the ingress node can determine the first tunnel based on the second label in the second packet, and can determine, based on the second bit error flag, that a bit error occurs. The ingress node can determine, based on the second label, that a bit error occurs on the first tunnel, so that the ingress node can accurately determine that a bit error occurs on the first tunnel, and further subsequent service switching can be performed.

With reference to the second aspect, in a possible implementation of the second aspect, the egress node determines a second tunnel based on the first label, and the egress node sends the second packet to the ingress node on the first tunnel through the second tunnel, where the second tunnel is a reverse tunnel of the first tunnel.

With reference to the second aspect, in a possible implementation of the second aspect, the second packet includes a second label and a second bit error flag. The second label is used by the ingress node to determine the first tunnel. The second bit error flag is used to indicate that a bit error occurs on a reverse tunnel of a tunnel through which the second packet is sent.

With reference to the second aspect, in a possible implementation of the second aspect, the first packet is a BFD packet, the BFD packet includes a diagnostic field, the diagnostic field is used to carry the first bit error flag, and a value of the first bit error flag is 30, and the second packet is a BFD packet, the BFD packet includes a diagnostic field, the diagnostic field is used to carry the second bit error flag, and a value of the second bit error flag is 31.

With reference to the second aspect, in a possible implementation of the second aspect, the first packet and the second packet each are a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

With reference to the second aspect, in a possible implementation of the second aspect, the egress node receives a third packet sent by a second intermediate node on the first tunnel through the first tunnel, where the third packet is a packet that is sent to the egress node when the second intermediate node detects that a bit error rate of a packet sent through the first tunnel exceeds a threshold, the first packet includes a first bit error rate, and the third packet includes a second bit error rate, and the egress node calculates a sum of the first bit error rate and the second bit error rate, where the sum of the first bit error rate and the second bit error rate exceeds a switching threshold of the egress node.

In the solution provided in this application, the egress node may calculate a sum of bit error rates of a packet sent by a plurality of intermediate nodes, and then compare the sum of the bit error rates with the switching threshold for determining. This can implement transferring of the bit error rates, and avoid a case in which a bit error occurs on a plurality of links but a bit error rate of each path does not reach the switching threshold, so that the egress node can accurately learn of a transmission status of the first tunnel, and feed back the transmission status of the first tunnel to the ingress node in a timely manner, and further the ingress node takes corresponding measures (for example, performs service switching) to avoid data traffic loss.

According to a third aspect, a method for advertising a bit error is provided. The method includes that an ingress node on a first tunnel receives a second packet sent by an egress node on the first tunnel, where the second packet indicates that a bit error occurs on the first tunnel, and the ingress node determines, based on the second packet, that a bit error occurs on the first tunnel.

In the solution provided in this application, after receiving the second packet that is sent by the egress node on the first tunnel and that indicates that a bit error occurs on the first tunnel, the ingress node on the first tunnel can determine that a bit error occurs on the first tunnel. In this way, bit error information can be transferred, and further end-to-end associated protection switching of services is implemented.

With reference to the third aspect, in a possible implementation of the third aspect, the ingress node on the first tunnel receives the second packet that is sent by the egress node on the first tunnel through a second tunnel, where the second tunnel is a reverse tunnel of the first tunnel.

With reference to the third aspect, in a possible implementation of the third aspect, the second packet includes a label and a bit error flag, and the bit error flag is used to indicate that a bit error occurs on a reverse tunnel of a tunnel through which the second packet is sent. The ingress node determines, based on the label, that a tunnel through which the second packet is sent is the second tunnel, and determines that the first tunnel is a reverse tunnel of the second tunnel. The ingress node determines, based on the bit error flag, that a bit error occurs on the first tunnel.

With reference to the third aspect, in a possible implementation of the third aspect, the second packet is a BFD packet, the BFD packet includes a diagnostic field, the diagnostic field is used to carry the bit error flag, and a value of the bit error flag is 31.

With reference to the third aspect, in a possible implementation of the third aspect, the second packet is a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

According to a fourth aspect, a method for advertising a bit error is provided. The method includes that a first node detects a bit error rate of a packet received from a second node, when detecting that the bit error rate reaches a threshold, the first node creates a BFD session between the first node and the second node, and the first node sends a BFD packet to the second node through the BFD session, where the BFD packet is used to indicate that a bit error occurs on the packet that is sent by the second node to the first node.

In the solution provided in this application, when detecting that the bit error rate reaches the threshold, the first node creates the BFD session, and sends the BFD packet to the second node, to notify the second node that a bit error occurs on the packet sent by the second node. In this way, bit error information can be transferred to the second node more quickly and accurately.

With reference to the fourth aspect, in a possible implementation of the fourth aspect, an IP address of the BFD packet is a multicast IP address, or a media access control (MAC) address of the BFD packet is a multicast MAC address.

In the solution provided in this application, the first node transfers bit error information by using the BFD packet for which the multicast IP address or the multicast MAC address is used, and can directly transfer the bit error information to the second node. This manner does not depend on configuring of IP addresses, and can be applied to both a layer 3 network and a layer 2 network, so that the bit error information can be transferred more widely.

With reference to the fourth aspect, in a possible implementation of the fourth aspect, a diagnostic field of the BFD packet is used to identify that a bit error occurs on the packet that is sent by the second node to the first node.

In the solution provided in this application, a special value of the diagnostic field in the BFD packet is used to represent the bit error flag. Therefore, another field may not be added or other information may not be sent to carry the bit error flag, and a format of the BFD packet does not need to be modified. This ensures that a packet that is sent is still a standard-format BFD packet, thereby avoiding interworking difficulties, and effectively transferring a bit error status. This implementation is simple and transmission efficiency is improved.

With reference to the fourth aspect, in a possible implementation of the fourth aspect, when detecting that the bit error rate is less than the threshold, the first node deletes the BFD session, and stops sending a BFD packet to the second node.

In the solution provided in this application, when detecting that the bit error rate is less than the threshold, the first node deletes the BFD session, and stops sending the BFD packet to the second node. This can avoid a waste of transmission resources, improve processing performance, and reduce power consumption.

According to a fifth aspect, a method for advertising a bit error is provided. The method includes that a second node sends a packet to a first node through a first tunnel, the second node receives a BFD packet sent by the first node, where the BFD packet is used to indicate that a bit error occurs on the packet that is sent by the second node to the first node, and the second node sends a packet to the first node through a second tunnel, where the second tunnel is different from the first tunnel.

In the solution provided in this application, the second node sends the packet to the first node through the first tunnel, receives the BFD packet sent by the first node, determines that a bit error occurs on the packet sent to the first node, and sends the packet to the first node through the second tunnel different from the first tunnel. In this way, the second node can receive bit error information sent by the first node more quickly and accurately, so that the second node can send a packet through the second tunnel in a timely manner, thereby avoiding data traffic loss.

With reference to the fifth aspect, in a possible implementation of the fifth aspect, a diagnostic field of the BFD packet is used to identify that a bit error occurs on the packet that is sent by the second node to the first node.

According to a sixth aspect, an intermediate node is provided. The intermediate node may be a router or a switch, or may be a chip in the router or in the switch. The intermediate node has functions of implementing the method performed by the intermediate node in the first aspect. The functions may be implemented by hardware, or may be implemented by hardware executing corresponding software. The hardware or the software includes one or more units corresponding to the foregoing functions.

In a possible design, the intermediate node includes a processing module and a transceiver module. The processing module may be, for example, a processor, and the transceiver module may be, for example, a transceiver. The transceiver module is configured to support communication between the intermediate node and an egress node on the first tunnel and communication between the intermediate node and an ingress node on the first tunnel. In an example, the transceiver module may further include a sending module and a receiving module, and may be configured to support the intermediate node to perform uplink communication and downlink communication. For example, the sending module may be configured to send a first packet to the egress node on the first tunnel, the receiving module may be configured to receive a packet that is sent through the first tunnel, and the processing module may be configured to detect a bit error rate of a received packet. Optionally, the intermediate node may further include a memory. The memory is configured to be coupled to the processor, and stores program instructions and data that are necessary for the intermediate node.

In another possible design, the intermediate node includes a processor and a transceiver. The processor is configured to control functions of each component, and the transceiver is configured to support communication between the intermediate node and the egress node on the first tunnel and communication between the intermediate node the ingress node on the first tunnel. For example, in downlink communication, the transceiver of the intermediate node may receive a packet sent by the ingress node on the first tunnel, and perform CRC detection to obtain a bit error rate. Optionally, the intermediate node further includes a memory, and the memory stores program instructions and data that are necessary for the intermediate node. For example, in uplink communication, the transceiver of the intermediate node may send, to the egress node, the first packet that carries a label and a bit error flag.

In still another possible design, when the intermediate node is the chip in the router or in the switch, the chip includes a processing module and a transceiver module. The processing module may be, for example, a processor, and the processor may be configured to detect a bit error rate of a data packet received by the transceiver module. The transceiver module may be, for example, an input/output interface on the chip. The processing module may execute computer executable instructions stored in a storage unit, to support the intermediate node to perform corresponding functions in the first aspect. Optionally, the storage unit may be a storage unit in the chip, for example, a register or a buffer. Alternatively, the storage unit may be a storage unit in the intermediate node but outside the chip, for example, a read-only memory (ROM), another type of static storage device that can store static information and instructions, or a random-access memory (RAM).

In still another possible implementation, the intermediate node includes a processor, and the processor is configured to be coupled to the memory, read the instructions from the memory, and perform, according to the instructions, functions of the intermediate node in the first aspect. The memory may be located inside the processor or outside the processor.

According to a seventh aspect, an egress node is provided. The egress node may be a router or a switch, or may be a chip in the router or in the switch. The egress node has functions of implementing the method performed by the egress node in the second aspect. The functions may be implemented by hardware, or may be implemented by hardware executing corresponding software. The hardware or the software includes one or more units corresponding to the foregoing functions.

In a possible design, the egress node includes a processing module and a transceiver module. The processing module may be, for example, a processor. The transceiver module may be, for example, a transceiver. The transceiver module is configured to support communication between the egress node and an intermediate node on a first tunnel and communication between the egress node and an ingress node on the first tunnel. In an example, the transceiver module may further include a sending module and a receiving module, and may be configured to support the egress node to perform uplink communication and downlink communication. For example, the receiving module may be configured to receive a first packet sent by the intermediate node through the first tunnel, the sending module may be configured to send a second packet to the ingress node on the first tunnel, and the processing module may be configured to determine, based on a first label and the first bit error flag, that a bit error occurs on the first tunnel. Optionally, the egress node may further include a memory. The memory is configured to be coupled to the processor, and stores program instructions and data that are necessary for the egress node.

In another possible design, the egress node includes a processor and a transceiver. The processor is configured to control functions of each component, and the transceiver is configured to support communication between the egress node and the intermediate node on the first tunnel and communication between the egress node and the ingress node on the first tunnel. For example, in downlink communication, the transceiver of the egress node may receive the first packet sent by the intermediate node on the first tunnel. Optionally, the egress node may further include a memory, and the memory stores program instructions and data that are necessary for the egress node. For example, in uplink communication, the transceiver of the egress node may send, to the ingress node, the second packet that carries a second label and a second bit error flag.

In still another possible design, when the egress node is the chip in the router or in the switch, the chip includes a processing module and a transceiver module. The processing module may be, for example, a processor, and the processor may be configured to calculate a sum of bit error rates of a data packet received by the transceiver module. The transceiver module may be, for example, an input/output interface on the chip. The processing module may execute computer executable instructions stored in a storage unit, to support the egress node to perform corresponding functions in the second aspect. Optionally, the storage unit may be a storage unit in the chip, for example, a register or a buffer. Alternatively, the storage unit may be a storage unit in the egress node but outside the chip, for example, a ROM, another type of static storage device that can store static information and instructions, or a RAM.

In still another possible implementation, the egress node includes a processor, and the processor is configured to be coupled to the memory, read the instructions from the memory, and perform, according to the instructions, functions of the egress node in the second aspect. The memory may be located inside the processor or outside the processor.

According to an eighth aspect, an ingress node is provided. The ingress node may be a router or a switch, or may be a chip in the router or in the switch. The ingress node has functions of implementing the method performed by the ingress node in the third aspect. The functions may be implemented by hardware, or may be implemented by hardware executing corresponding software. The hardware or the software includes one or more units corresponding to the foregoing functions.

In a possible design, the ingress node includes a processing module and a transceiver module. The processing module may be, for example, a processor. The transceiver module may be, for example, a transceiver. The transceiver module is configured to support communication between the ingress node and an egress node on a first tunnel and communication between the ingress node and an intermediate node on the first tunnel. In an example, the transceiver module may further include a sending module and a receiving module, and may be configured to support the ingress node to perform uplink communication and downlink communication. For example, the sending module may be configured to send a packet to the intermediate node on the first tunnel, and the receiving module may be configured to receive a second packet sent by the egress node through a second tunnel. The processing module may be configured to determine, based on the second packet, that a bit error occurs on the first tunnel. Optionally, the ingress node may further include a memory. The memory is configured to be coupled to the processor, and stores program instructions and data that are necessary for the ingress node.

In another possible design, the ingress node includes a processor and a transceiver. The processor is configured to control functions of each component, and the transceiver is configured to support communication between the ingress node and the egress node on the first tunnel and communication between the ingress node and the intermediate node on the first tunnel. For example, in downlink communication, the transceiver of the ingress node may receive a second packet sent by the egress node through a second tunnel, and determine, based on the second packet, that a bit error occurs on the first tunnel. Optionally, the ingress node further includes a memory, and the memory stores program instructions and data that are necessary for the ingress node. For example, in uplink communication, the transceiver of the ingress node may send a packet to the intermediate node.

In still another possible design, when the ingress node is the chip in the router or in the switch, the chip includes a processing module and a transceiver module. The processing module may be, for example, a processor, and the processor may be configured to parse a data packet received by the transceiver module, and determine that a bit error occurs on the first tunnel. The transceiver module may be, for example, an input/output interface on the chip. The processing module may execute computer executable instructions stored in a storage unit, to support the ingress node to perform corresponding functions in the third aspect. Optionally, the storage unit may be a storage unit in the chip, for example, a register or a buffer. Alternatively, the storage unit may be a storage unit in the ingress node but outside the chip, for example, a ROM, another type of static storage device that can store static information and instructions, or a RAM.

In still another possible implementation, the ingress node includes a processor, and the processor is configured to be coupled to the memory, read the instructions from the memory, and perform, according to the instructions, functions of the ingress node in the third aspect. The memory may be located inside the processor or outside the processor.

According to a ninth aspect, a first node is provided. The first node may be a router or a switch, or may be a chip in the router or in the switch. The first node has function of implementing the method performed by the first node in the fourth aspect. The functions may be implemented by hardware, or may be implemented by hardware executing corresponding software. The hardware or the software includes one or more units corresponding to the foregoing functions.

According to a tenth aspect, a second node is provided. The second node may be a router or a switch, or may be a chip in the router or in the switch. The second node has functions of implementing the method performed by the second node in the fifth aspect. The functions may be implemented by hardware, or may be implemented by hardware executing corresponding software. The hardware or the software includes one or more units corresponding to the foregoing functions.

According to an eleventh aspect, a computer non-transitory storage medium is provided. The computer non-transitory storage medium includes instructions. When the instructions are run on an intermediate node, the intermediate node is enabled to perform the method according to any one of the first aspect or the implementations of the first aspect.

According to a twelfth aspect, a computer non-transitory storage medium is provided. The computer non-transitory storage medium includes instructions. When the instructions are run on an egress node, the egress node is enabled to perform the method according to any one of the second aspect or the implementations of the second aspect.

According to a thirteenth aspect, a computer non-transitory storage medium is provided. The computer non-transitory storage medium includes instructions. When the instructions are run on an ingress node, the ingress node is enabled to perform the method according to any one of the third aspect or the implementations of the third aspect.

According to a fourteenth aspect, a computer non-transitory storage medium is provided. The computer non-transitory storage medium includes instructions. When the instructions are run on a first node, the first node is enabled to perform the method according to any one of the fourth aspect or the implementations of the fourth aspect.

According to a fifteenth aspect, a computer non-transitory storage medium is provided. The computer non-transitory storage medium includes instructions. When the instructions are run on a second node, the second node is enabled to perform the method according to any one of the fifth aspect or the implementations of the fifth aspect.

BRIEF DESCRIPTION OF DRAWINGS

FIG. 1 is a schematic diagram of a standard format of a valid payload of a BFD packet according to an embodiment of this application;

DESCRIPTION OF EMBODIMENTS

Figure 2:
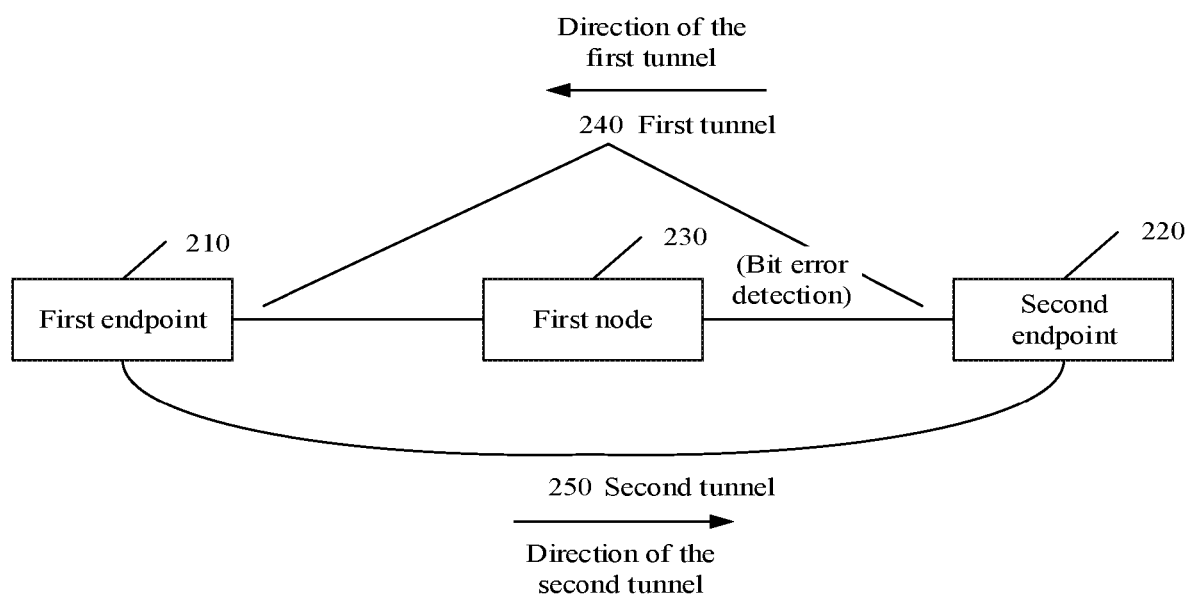
FIG. 2 is a schematic diagram of an application scenario according to an embodiment of this application.

The following clearly describes the technical solutions in the embodiments of this application with reference to the accompanying drawings. It is clearly that the described embodiments are merely some rather than all of the embodiments of this application.

Some terms and related technologies in this application are first described with reference to the accompanying drawings, to help a person skilled in the art have a better understanding.

A bit error rate ((symbol error rate (SER)) or (bit error rate (BER))) is a counter for measuring data transmission precision within a specified time. A bit error occurs because decay changes a voltage of a signal during signal transmission and the signal is caused to be damaged during transmission. A bit error may be caused (for example, a transferred signal is 1 whereas a received signal is 0) by noise, pulse caused by alternating current or sudden current, a fault of a transmission device, or other factors. Bit error rate=quantity of bit errors during transmission/total quantity of transferred bits*100%. Therefore, if there is a bit error, there is definitely a bit error rate.

CRC is a technique for check by using a hash function of a check code with a fixed quantity of bits that is generated based on data such as network data packets or computer files, and is mainly used to detect or check, according to a principle of division with remainder, an error that possibly occurs after data transmission or data storage. For example, in this application, an intermediate node device may perform bit error detection on received data through CRC.

A BFD protocol is a network protocol for detecting faults between two forwarding nodes. BFD may be used to perform bidirectional fault detection on a link between two network nodes. The link may be a physical link or a logical link (for example, a label-switched path (LSP) or a tunnel). BFD can provide a fault detection service for different upper-layer applications (for example, a Multiprotocol Label Switching (MPLS) application, an Open Shortest Path First (OSPF) application, and an IS-IS application), and provide a same fault detection time. In addition, BFD can be associated with upper-layer routing protocols to implement fast route convergence and ensure service continuity. In addition, a BFD packet can be used to perform fault detection on links, the BFD packet can further carry other information, and further the other information is transferred to a peer-end device. For example, in this application, a BFD packet carries bit error information and a label, and further the bit error information and the label are transferred to the peer-end device.

An IS-IS protocol is an interior gateway protocol. The IS-IS protocol is a hierarchical link-state routing protocol that uses a hello protocol to search for adjacent nodes and uses a propagation protocol to send link information. An IS-IS packet can also carry bit error information for transmission, but the IS-IS packet can be transferred only on the layer 2 network.

An LSP is a packet forwarding path established according to the MPLS protocol. Each node on the LSP includes label switching routers (LSRs), and packets to which labels are added are transferred along the LSP constituted by a series of LSRs. An ingress label edge router (LER) is referred to as an ingress router, and is configured to receive packets and add labels to the packets. An egress LER is referred to as an egress router. In a network constituted by LSRs, the LSRs forward the packets based on the labels added on the packets and a label forwarding table (LFIB).

To improve quality of service (QoS) and reduce occasional packet loss to avoid data traffic loss, bit error information needs to be transferred to an endpoint device when a bit error occurs on a transmission link, so that the endpoint device can perform associated protection switching of services in a timely manner after receiving the bit error information. In other words, service traffic can be transferred through a standby transmission link to bypass a link on which severe bit errors occur, thereby ensuring service continuity.

The bit error information can be transferred by extending a BFD packet by adding a TLV field to the tail of the BFD packet. The TLV is a highly efficient and well extensible coding mode for protocol packets. A type field is information about a label and a coding format, a length field defines a length of a value, and a value field indicates an actual value.

FIG. 1 is a schematic diagram of a standard format of a valid payload of a BFD packet. The packet includes a 3-bit BFD protocol version field, a 5-bit diagnostic field, a 2-bit BFD local state field, a 1-bit poll field, a 1-bit final field, a 1-bit control plane independent flag field, a 1-bit authentication present field, a 1-bit demand field, a 1-bit reserved field that is set to support future point-to-multipoint extension, an 8-bit detect mult field, an 8-bit length field of a BFD packet, a 32-bit my discriminator field, a 32-bit your discriminator field, a 32-bit desired min tx interval field of a BFD packet, a 32-bit required min rx interval field of a BFD packet, and a 32-bit required min echo rx interval field.

To transfer bit error information, a TLV field such as a bit error rate type field and a bit error rate coefficient field is added to the tail of the standard-format BFD packet shown in FIG. 1, to transfer the bit error information. However, the format of a BFD packet is changed if this manner is used. The transferred BFD packet is no longer a standard-format BFD packet. Because there is no unified standard, interworking with each other is difficult to implement. A peer-end device may be incapable of parsing the BFD packet whose format is modified, and further cannot obtain bit error information carried in the BFD packet.

In addition, an IS-IS packet may be used to transmit bit error information. An IS-IS hello packet is first generated, and bit error information such as a bit error level indicating severity of a bit error and a bit error flag indicating a type of the bit error is carried in a TLV field of the IS-IS hello packet. However, the manner of using the IS-IS packet can be used to transfer bit error information only in a layer 2 network because the IS-IS packet can be transferred only in the layer 2 network. In other words, bit error information can be transferred only between two directly connected devices. If there are layer 3 devices or a plurality of intermediate devices between two endpoint devices, the manner of using the IS-IS packet to transfer bit error information is inapplicable. To be specific, bit errors cannot be directly perceived by endpoint devices, and associated protection switching of services cannot be performed between the endpoint devices, causing data traffic lost.

To resolve the foregoing problem, this application provides a method for advertising a bit error and related devices, so that when a bit error occurs on a transmission link, bit error information can be transferred, end-to-end associated protection switching of services is implemented, occasional packet loss is reduced, and data traffic loss is avoided.

The technical solutions in the embodiments of this application may be used in a wide area network (WAN), a metropolitan area network (MAN), a wireless local area network (WLAN), or another network. The foregoing communications networks have a same characteristic, that is, a BFD session and an LSP can be established between any two devices in the networks, and a BFD packet can be used to transfer bit error information.

In a specific embodiment, as shown in FIG. 2, a first endpoint 210, a second endpoint 220, and a first node 230 constitute a communications system. In the communications system, there is a first tunnel 240 established between the first endpoint 210 and the second endpoint 220, and the first tunnel 240 may be further represented as an LSP between the first endpoint 210 and the second endpoint 220. The first endpoint 210 is an egress node on the first tunnel 240, the second endpoint 220 is an ingress node on the first tunnel 240, and the first node 230 is an intermediate node on the first tunnel 240. The first node 230 performs bit error detection on a packet that is sent through the first tunnel 240.

The first node 230 sends a first packet to the first endpoint 210 when detecting that a bit error rate exceeds a threshold, where the first packet indicates that a bit error occurs on the first tunnel 240. The first endpoint 210 sends a second packet to the second endpoint 220 through a second tunnel 250 after receiving the first packet, where the second tunnel 250 is a reverse tunnel of the first tunnel 240, and the second packet is used to indicate that a bit error occurs on the first tunnel 240. The second endpoint 220 determines that a bit error occurs on the first tunnel 240 after receiving the second packet.

In the embodiments of this application, an egress/ingress node and an intermediate node are related. The egress/ingress node and the intermediate node may be entities configured to receive or transmit signals, for example, switches, routers, distributed cluster servers, or stations (STAs) and access points (APs) in a WLAN, and the like. This is not limited in this application.

Figure 3:
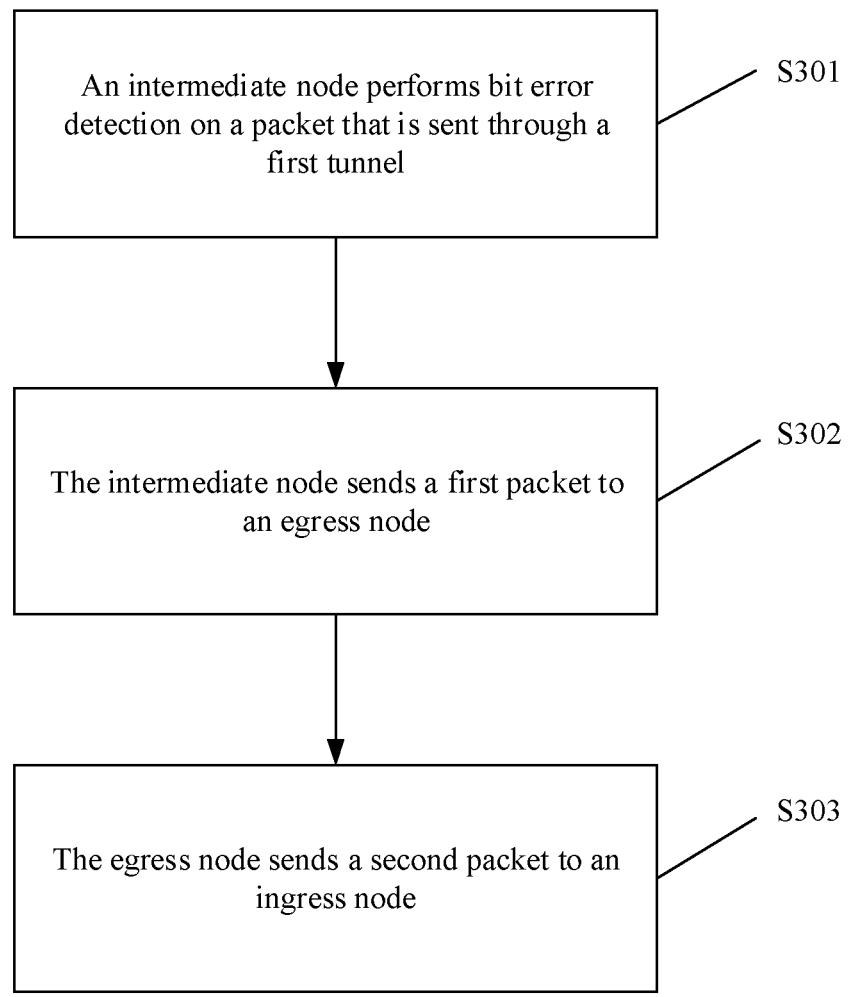
FIG. 3 is a schematic flowchart of a method for advertising a bit error according to an embodiment of this application.

FIG. 3 is a schematic flowchart of a method for advertising a bit error according to an embodiment of this application. As shown in FIG. 3, the method includes but is not limited to the following steps.

S301: An intermediate node detects a bit error of a packet that is sent through a first tunnel.

Further, there is the first tunnel established between an egress node and an ingress node, and the intermediate node is a node on the first tunnel. It should be understood that there may be a plurality of intermediate nodes on the first tunnel, and each intermediate node may perform bit error detection on a packet that is received by the intermediate node.

Optionally, the intermediate node may perform, through CRC, bit error detection on the packet that is sent through the first tunnel, to detect whether a bit error rate of the packet exceeds a threshold. The threshold may be set depending on an actual requirement. A specific value of the threshold is not limited in this application. Particularly, when there is a plurality of intermediate nodes, thresholds for bit error rates on all of the plurality of intermediate nodes may be set to the same or different.

In a specific embodiment, the intermediate node calculates a sum of bit error rates of a packet forwarded through a plurality of paths on the first tunnel, and detects whether the sum of the bit error rates exceeds the threshold.

Further, a bit error may occur on the plurality of paths on the first tunnel, and a bit error rate of each path does not exceed the threshold. The intermediate node calculates the sum of the bit error rates of the plurality of paths on which a bit error occurs, and detects whether the sum of the bit error rates exceeds the threshold.

It should be understood that, when calculating the sum of the bit error rates of the plurality of paths, the intermediate node does not perform simple algebraic addition, but calculates the sum of the bit error rates according to a specific rule and algorithm, for example, calculates the sum of the bit error rates through addition of vector. A specific algorithm that is to be used is not limited in this application.

For example, a bit error occurs on two paths on the first tunnel, and the threshold is 2%. A bit error rate of a first path is 1.5%, and a bit error rate of a second path segment is also 1.5%, and the two bit error rates each do not reach the threshold. The intermediate node calculates a sum of the bit error rates of the two paths, and learns that the sum of the bit error rates is 2.5%, where 2.5% exceeds the threshold. Therefore, the intermediate node needs to send the first packet to the egress node on the first tunnel to transfer bit error information.

It should be noted that, during packet transferring on the first tunnel, if a bit error is generated on a plurality of paths, a sum of bit error rates that is calculated should be greater than a maximum value of the bit error rates of the plurality of paths, and is less than an algebraic sum of the bit error rates of the plurality of paths. For example, in the foregoing example, the calculated sum of the bit error rates is 2.5%, where 2.5% is greater than 1.5% and less than 3%. It is easy to understand that, during packet transferring, bit errors occur may accumulate on the plurality of paths, and therefore a final bit error rate is less than a sum of the bit error rates of all the paths, that is, a finally calculated bit error rate is less than an algebraic sum of the bit error rates of all the paths.

It can be learned that the intermediate node may calculate the sum of the bit error rates of the plurality of paths on which a bit error occurs. This can avoid a case in which a bit error rate of each path does not reach the threshold but the sum of the bit error rates exceeds the threshold, thereby ensuring that the egress node on the first tunnel can receive, in time, the first packet sent by the intermediate node, obtain the bit error information, and further take corresponding measures to avoid data traffic loss.

S302: The intermediate node sends the first packet to the egress node.

Further, the intermediate node sends the first packet to the egress node on the first tunnel when detecting that the bit error rate exceeds the threshold, where the first packet carries the bit error information.

In a specific embodiment, the first packet includes a first label and a first bit error flag. The first label is used by the egress node to determine the first tunnel, and the first bit error flag is used to indicate that a bit error occurs on a tunnel through which the first packet is sent.

Further, the packet is transferred through the first tunnel based on a label. After performing bit error detection, the intermediate node searches for all LSPs in an LFIB of the intermediate node, adds a corresponding label to the first packet after finding a corresponding LSP (that is, the first tunnel), and directly sends the first packet to the egress node on the first tunnel, or sends the first packet to a next intermediate node, and further sends the first packet to the egress node on the first tunnel through the next intermediate node. After receiving (directly receiving or indirectly receiving) the first packet, the egress node can determine the first tunnel based on the label carried in the first packet, and further determine the ingress node on the first tunnel.

Further, the intermediate node also adds the first bit error flag to the first packet for sending. After receiving the first packet, the egress node can determine, based on the first bit error flag in the first packet, that a bit error occurs on the tunnel through which the first packet is sent, and determine, based on the first bit error flag together with the label in the first packet, that a bit error occurs on the first tunnel.

Optionally, the intermediate node creates a first BFD session, adds the first label and the first bit error flag to the first BFD packet, and sends a first BFD packet to the egress node.

In a specific embodiment, the first BFD packet includes a diagnostic field, the diagnostic field is used to carry the first bit error flag, and a value of the first bit error flag is 30.

Further, the intermediate node sends the first BFD packet to the egress node, where a format of the first BFD packet is a standard BFD packet format, and a specific form of the first BFD packet is shown in FIG. 1. It should be understood that the problem that interworking is difficult because packets cannot be parsed can be overcome, because the standard BFD packet format is used.

Further, in the packet format shown in FIG. 1, a 5-bit diagnostic field is included. In an existing request for comments (RFC), meanings of only values 0 to 8 are defined. For example, 1 indicates control detection time expired, 2 indicates echo function failed, and 4 indicates forwarding plane reset. Meanings of values 9 to 31 are not defined in the RFC, and the values 9 to 31 are reserved values. In this application, a value (ranging from 9 to 31) of the diagnostic field is added, and the newly added value is defined, so that a BFD packet can be used to transfer the first bit error flag. For example, when a value of the diagnostic field is 30, it indicates that a forward bit error occurs (that is, a bit error occurs on a path through which a packet passes, from the ingress node on the first tunnel to the egress node on the first tunnel). After receiving the first BFD packet, the egress node may learn, based on the value of the diagnostic field in the first BFD packet, that a bit error exists in the packet that is sent through the first tunnel. It should be understood that another value of the diagnostic field may be used to indicate the first bit error flag, for example, 10. This is not limited in this application.

It can be learned that a special value of the diagnostic field is used to represent the bit error flag, so that another field may not be added or other information may not be used to carry the bit error flag. In this way, a format of the BFD packet does not need to be modified, and it is ensured that a transferred packet is still a standard-format BFD packet, thereby avoiding a problem that interworking is difficult to implement. In addition, a bit error flag can be effectively transferred, thereby improving transmission efficiency.

It should be noted that, when the intermediate node sends the first BFD packet to the egress node, when the value of the diagnostic field is a value defined in this application, the intermediate node may set all bits included in the remote-end your discriminator field in the packet to 1. It should be understood that a value of the remote-end your discriminator field in the BFD packet can be determined only through negotiation with a peer end of a session (that is, the value is obtained from the peer end of the session). For example, when the intermediate node needs to send the first BFD packet to the egress node, the intermediate node can determine the value of the remote-end your discriminator field in the first BFD packet only after the intermediate node performs negotiation with the egress node. However, in this application, when the intermediate node sends the first BFD packet to the egress node, because the intermediate node does not perform negotiation, the intermediate node cannot determine the value of the remote-end your discriminator field in the first BFD packet. Therefore, for ease of management, the field is set to a special value, for example, all bits included in the field are set to 1.

In a specific embodiment, the first BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

Further, the standard-format BFD packet that is sent by the intermediate node to the egress node includes a 32-bit required min echo rx interval field. When a value of the diagnostic field is a value defined in this application, the required min echo rx interval field may be used to transfer the bit error rate. A coefficient and an exponent of the bit error rate are represented by the first m bits and the middle n bits in the required min echo rx interval field, respectively.

For example, the intermediate node detects that the bit error rate is $7 \times 10^{-5}$, and the first four bits 0111 of the required min echo rx interval field represent the coefficient of the bit error rate, the middle three bits 101 of the required min echo rx interval field represent the exponent of the bit error rate, and the remaining 25 bits are reserved bits.

It can be learned that, the intermediate node may transfer, by reusing the required min echo rx interval field, the detected bit error rate to the egress node on the first tunnel, so that the egress node can more directly obtain the bit error rate from the received first packet, without additionally transferring the bit error rate. This reduces transmission resource overheads and improves transmission efficiency.

In a specific embodiment, the egress node receives a third packet sent by a second intermediate node on the first tunnel through the first tunnel, where the third packet is a packet sent to the egress node when the second intermediate node detects that a bit error rate of a packet sent through the first tunnel exceeds a threshold, the first packet includes a first bit error rate, and the third packet includes a second bit error rate. The egress node calculates a sum of the first bit error rate and the second bit error rate, where the sum of the first bit error rate and the second bit error rate exceeds a switching threshold of the egress node.

Further, there are a plurality of transmission paths on the first tunnel. To be specific, a packet or data sent by the ingress node on the first tunnel needs to be forwarded by a plurality of intermediate nodes on the first tunnel before being received by the egress node on the first tunnel. Each intermediate node may perform CRC detection on received data to obtain a bit error rate of the path. After obtaining the bit error rate, each intermediate node may create a BFD session with the egress node, send a BFD packet to the egress node, and add a corresponding label, a corresponding bit error flag, and a corresponding bit error rate to the BFD packet. The egress node may calculate a sum of bit error rates of all received BFD packets to obtain a sum of the bit error rates, and then compare the sum of the bit error rates with the switching threshold. When the sum of the bit error rates exceeds the switching threshold, the egress node feeds back, to the ingress node on the first tunnel, that the sum of the bit error rates exceeds the switching threshold.

It should be understood that, when calculating the sum of the bit error rates, the egress node does not perform simple algebraic addition, but calculates the sum of the bit error rates according to a specific rule or algorithm, for example, calculates the sum of the bit error rates through addition of vector. A specific rule or algorithm that is to be used is not limited in this application. For descriptions of calculating the sum of the bit error rates, refer to related descriptions in S301. For brevity, details are not described herein again.

Figure 4:
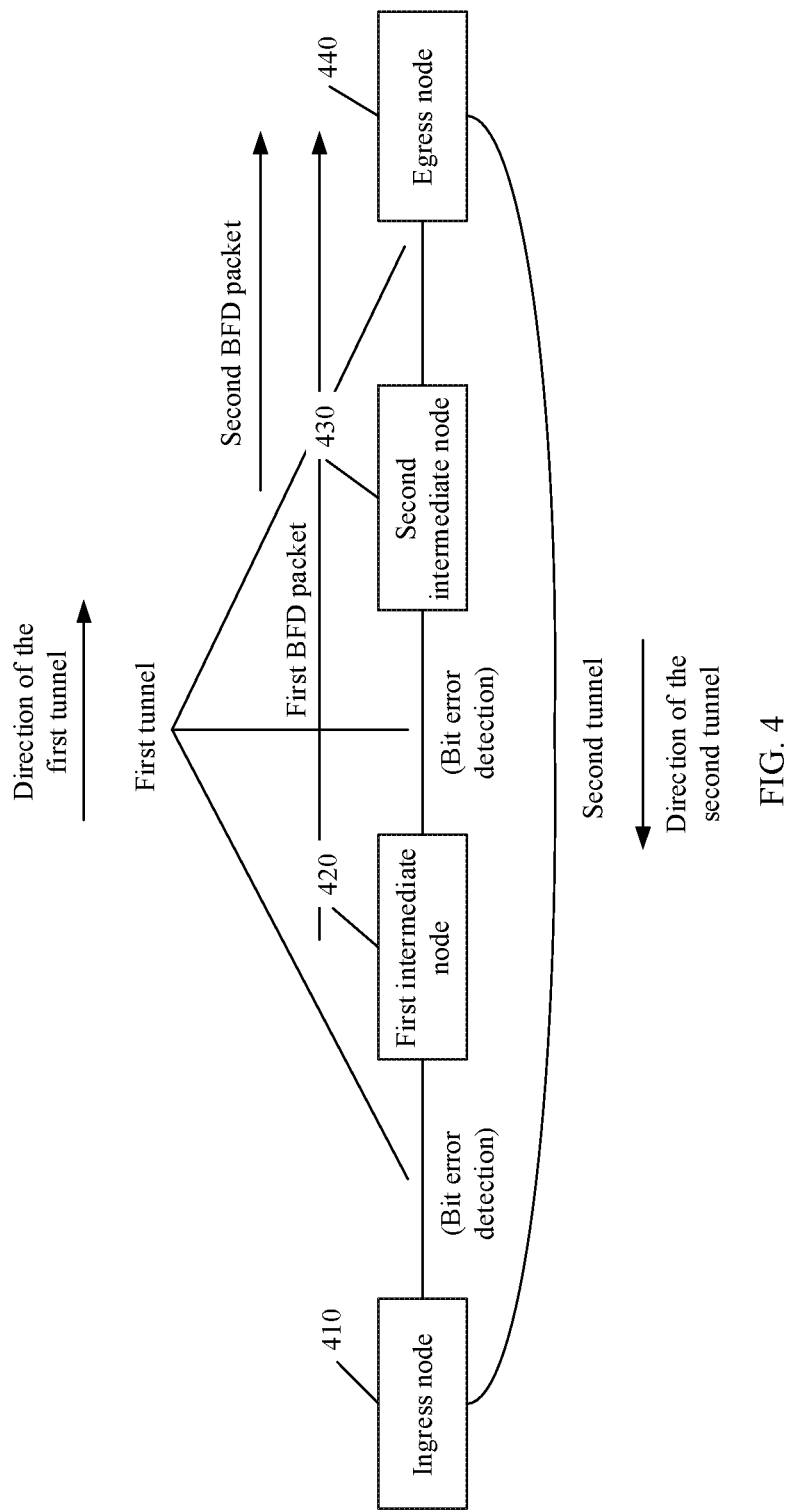
FIG. 4 is a schematic diagram of a principle for calculating a sum of bit error rates of a plurality of paths according to an embodiment of this application.

For example, FIG. 4 is a schematic diagram of a principle for calculating a sum of bit error rates of a plurality of paths according to an embodiment of this application. As shown in FIG. 4, an ingress node 410 is connected to an egress node 440 through a first intermediate node 420 and a second intermediate node 430. The path is a first tunnel established between the ingress node 410 and the egress node 440, and a packet is transferred through the first tunnel based on a label. After receiving data, at a port of the first intermediate node 420, sent by the ingress node 410, the first intermediate node 420 performs CRC detection at the port of the first intermediate node 420, the first intermediate node 420 creates a first BFD session when detecting that a bit error occurs, and sends the first BFD packet to the egress node 440, where the first BFD packet carries a first bit error rate. After receiving data, at a port of the second intermediate node 430, forwarded by the first intermediate node 420, the second intermediate node 430 also performs CRC detection at the port of the second intermediate node 430, creates a second BFD session when detecting that a bit error occurs, and sends a second BFD packet to the egress node 440, where the second BFD packet carries a second bit error rate. After receiving the first BFD packet and the second BFD packet, the egress node 440 calculates a sum of the first bit error rate and the second bit error rate to obtain a total bit error rate, and then compares the total bit error rate with the switching threshold. When the total bit error rate exceeds the switching threshold, the egress node 440 feeds back, to the ingress node 410 through a second tunnel, that the total bit error rate exceeds the switching threshold. It should be understood that the second tunnel is a reverse tunnel of the first tunnel, and the second tunnel may be established by connecting the egress node 440 to the ingress node 410 through the second intermediate node 430 and the first intermediate node 420, or the second tunnel may be established by connecting the egress node 440 to the ingress node 410 through another intermediate node. In this case, the ingress node 410 on the first tunnel becomes an egress node on the second tunnel, and the egress node 440 on the first tunnel becomes an ingress node on the second tunnel.

Optionally, after determining that the sum of the bit error rates exceeds the switching threshold, the egress node generates a first tunnel bit error event, to trigger an upper-layer application on the egress node to perform traffic engineering (TE) hot-standby (HSB) or pseudo wire (PW) switching.

S303: The egress node sends a second packet to the ingress node.

Further, after determining the ingress node based on the label in the first packet, the egress node sends the second packet to the ingress node through the second tunnel, to notify the ingress node that a bit error occurs on the first tunnel. The second tunnel is a reverse tunnel of the first tunnel.

In a specific embodiment, the second packet includes a second label and a second bit error flag. The second bit error flag is used to indicate that a bit error occurs on a reverse tunnel of a tunnel through which the second packet is sent. The second label is used by the ingress node to determine that a tunnel through which the second packet is sent is the second tunnel, and determine that the first tunnel is a reverse tunnel of the second tunnel.

Further, the egress node determines the second tunnel based on the second label in the second packet, and can determine that the reverse tunnel of the second tunnel is the first tunnel, because the egress node on the first tunnel is the ingress node of the second tunnel. The egress node can determine, based on the second label together with the second bit error flag in the second packet, that a bit error occurs on the first tunnel.

Optionally, the egress node creates a second BFD session, adds the second label and the second bit error flag to a second BFD packet, and sends the second BFD packet to the ingress node through the second tunnel.

In a specific embodiment, the second BFD packet includes a diagnostic field, the diagnostic field is used to carry the second bit error flag, and a value of the second bit error flag is 31. Certainly, another value may be used to represent the second bit error flag. This is not limited in this application. For descriptions of the diagnostic field, refer to related descriptions in S302. For brevity, details are not described herein again.

In a specific embodiment, the second BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

For descriptions of the required min echo rx interval field, refer to related descriptions in S302. For brevity, details are not described herein again.

Further, after determining that a bit error occurs on the first tunnel, the ingress node generates a first tunnel bit error event, to trigger an upper-layer application on the ingress node to perform TE HSB or PW switching, that is, the ingress node sends data to the egress node not through the first tunnel but through a backup tunnel, to avoid data traffic loss.

Optionally, the egress node creates a third BFD session that matches the first BFD session, receives the first BFD packet sent by the intermediate node, and detects whether the bit error is eliminated. The intermediate node periodically sends the first BFD packet to the egress node. If the egress node does not receive, within a first preset period of time, the first BFD packet sent by the intermediate node, it is considered that the bit error has been eliminated, that is, there is no bit error on the first tunnel, and the first tunnel can be normally used. The egress node deletes the second BFD session and the third BFD session. The first preset period of time may be set depending on an actual requirement. For example, the first preset period of time may be set to 3.5 transmit intervals of a BFD packet. This is not limited in this application. Alternatively, the intermediate node detects that the bit error rate does not exceed the threshold, and uses the diagnostic field to carry a bit error elimination flag. For example, when the value of the diagnostic field is 29, it indicates that the bit error has been eliminated. After receiving the BFD packet that carries the bit error elimination identifier, the egress node determines, based on the value of the diagnostic field, that the bit error has been eliminated, where the first tunnel may continue to be used normally, and delete the second BFD session and the third BFD session.

Further, the ingress node creates a fourth BFD session that matches the second BFD session, and receives the second BFD packet sent by the egress node, to detect whether the bit error on the first tunnel is eliminated. The egress node periodically sends the second BFD packet to the ingress node. If the ingress node does not receive, within a second preset period of time, the second BFD packet sent by the egress node, it is considered that the bit error on the first tunnel has been eliminated and the first tunnel can be normally used. In this case, the ingress node sends data to the egress node through the first tunnel again, that is, data traffic is switched from a standby tunnel to the first tunnel, and the ingress node deletes the fourth BFD session. The second preset period of time may be the same as the first preset period of time, for example, 3.5 transmit intervals of a BFD packet. This is not limited in this application. Alternatively, after the egress node determines that the bit error on the first tunnel is eliminated, the diagnostic field is used to carry a bit error elimination flag. After receiving a BFD packet that carries the bit error elimination flag, the ingress node can determine, based on the value of the diagnostic field, that the bit error on the first tunnel has been eliminated, use the first tunnel again to send data to the egress node, and delete the fourth BFD session.

It should be understood that step S301 to step S303 in the foregoing method embodiment are merely schematic descriptions, and should not constitute any specific limitation. Related steps may be added, deleted, or combined as required.

Figure 5:
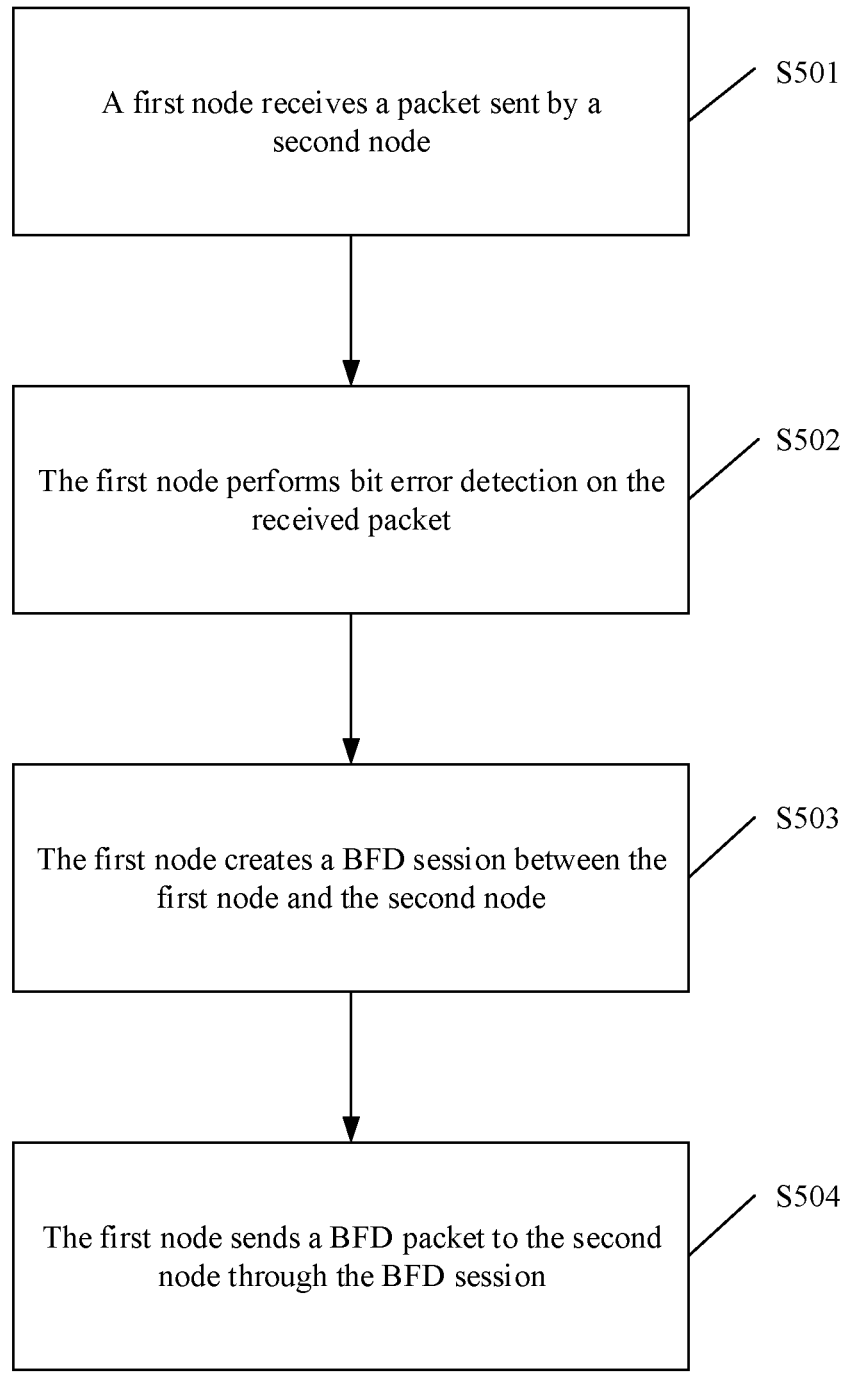
FIG. 5 is a schematic flowchart of another method for advertising a bit error according to an embodiment of this application.

FIG. 5 is a schematic flowchart of another method for advertising a bit error according to an embodiment of this application. As shown in FIG. 5, the method includes but is not limited to the following steps.

S501: A first node receives a packet sent by a second node.

Further, the first node and the second node are two directly connected devices, and there is no intermediate device between the first node and the second node.

S502: The first node detects a bit error rate of the received packet.

Further, after receiving, at a port of the first node, a packet sent by the second node, the first node may perform bit error detection on the packet through CRC at the port of the first node, to detect whether the bit error rate of the packet exceeds a threshold. The threshold may be set depending on an actual requirement. A specific value is not limited in this application.

S503: The first node creates a BFD session between the first node and the second node.

Further, after it is detected, at the port of the first node, that the bit error rate exceeds the threshold, a link protocol status of the port changes to down, and the first node creates the BFD session between the first node and the second node.

S504: The first node sends a BFD packet to the second node through the BFD session.

Further, after creating the BFD session, the first node periodically sends a BFD packet to the second node.

In a specific embodiment, an IP address of the BFD packet is a multicast IP address, or a MAC address of the BFD packet is a multicast MAC address.

Further, a multicast IP address or a multicast MAC address may be used for the BFD packet that is sent by the first node to the second node. In other words, the first node may directly send the BFD packet to the second node, instead of that the first node first obtains an IP address of the second node, and then sends the BFD packet to the second node based on the obtained IP address.

It may be understood that the multicast IP address or the multicast MAC address is used for sending a BFD packet, and this manner does not depend on an IP address configured at a port of a node, that is, an IP address of a port of a target node does not need to be obtained in advance. In this way, the BFD packet can be transferred both in a layer 3 network and a layer 2 network, so that a method for transmitting a BFD packet can be used in both the layer 3 network and the layer 2 network.

In a specific embodiment, a diagnostic field of the BFD packet is used to identify that a bit error occurs on the packet that is sent by the second node to the first node.

Further, the BFD packet sent by the first node is a BFD packet in a standard format, and the BFD packet includes a 5-bit diagnostic field, which corresponds to 32 values: 0 to 31. The RFC defines meanings of only values 0 to 8. In this application, a value that is not defined may be used to identify that a bit error occurs on the packet that is sent by the second node to the first node. For example, when a value of the diagnostic field is 28, it indicates that a bit error occurs. After receiving the BFD packet, the second node can determine, based on the value of the diagnostic field, that a bit error occurs on the packet sent to the first node. For descriptions of the diagnostic field and how to obtain a value of the diagnostic field, refer to related descriptions in the method embodiment in FIG. 3. For brevity, details are not described herein again.

Further, after receiving the BFD packet sent by the first node, the second node triggers an upper-layer service associated with the port of the first node to perform protection switching, that is, the second node sends data to the first node through a standby link, to avoid data traffic loss.

Optionally, the second node creates a BFD session between the second node and the first node, receives a BFD packet that is periodically sent by the first node, and detects whether the bit error is eliminated. If the first node detects that the bit error rate is less than the threshold, the first node stops sending a BFD packet to the second node, and deletes the BFD session. If the second node does not receive, within a preset period of time, the BFD packet sent by the first node, it is considered that the bit error has been eliminated, and the second node deletes the BFD session, and sends data to the first node through a previously used link again, that is, data traffic is switched from a standby link to the previously used link. The preset period of time may be set depending on an actual requirement. For example, the preset period of time may be set to 3.5 transmit intervals of a BFD packet. This is not limited in this application. Alternatively, the first node detects that the bit error rate is less than a threshold, the first node uses the diagnostic field to carry a bit error elimination flag. For example, when the value of the diagnostic field is 29, it indicates that the bit error has been eliminated. After receiving the BFD packet that carries the bit error elimination flag, the second node can determine, based on the value of the diagnostic field, that the bit error has been eliminated, deletes the BFD session, and sends data to the first node through the original link again. In addition, after the bit error is eliminated, a link protocol status of the port of the first node is recovered to up.

It should be understood that step S501 to step S504 in the foregoing method embodiment are merely schematic descriptions, and should not constitute any specific limitation. Related steps may be added, deleted, or combined as required.

Figure 6:
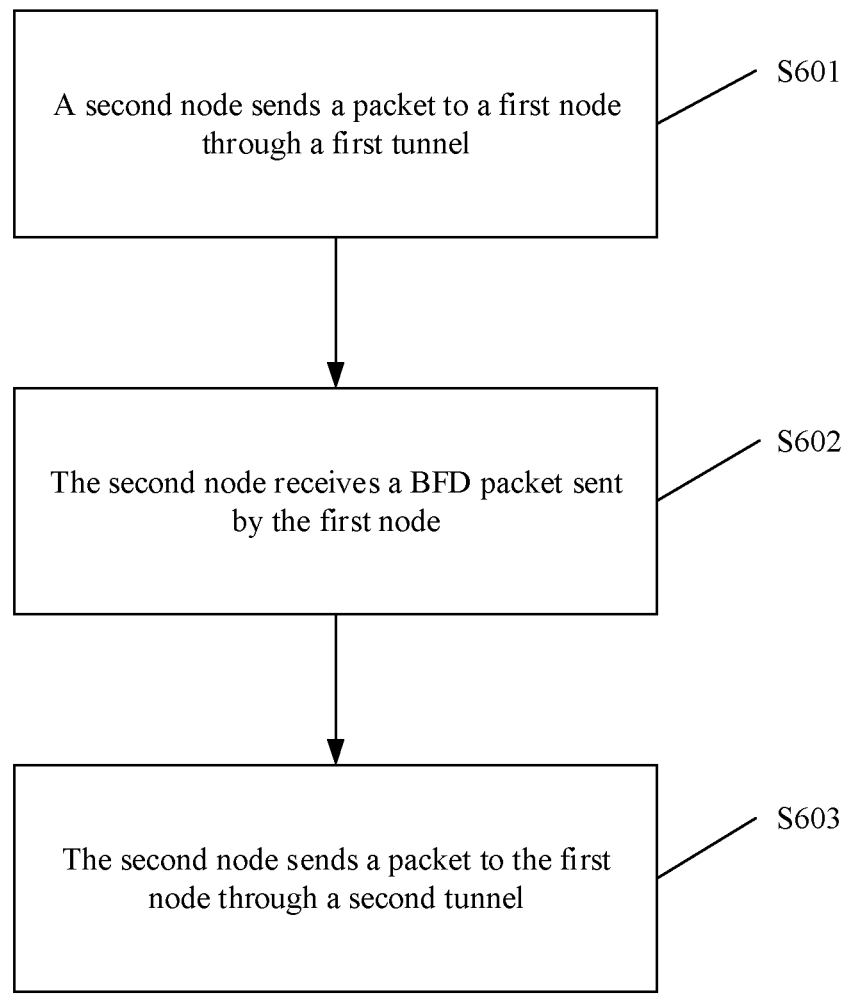
FIG. 6 is a schematic flowchart of still another method for advertising a bit error according to an embodiment of this application.

FIG. 6 is a schematic flowchart of still another method for advertising a bit error according to an embodiment of this application. As shown in FIG. 6, the method includes but is not limited to the following steps.

S601: A second node sends a packet to a first node through a first tunnel.

Further, the second node and the first node may be two directly connected devices, that is, the first tunnel may be a direct link between the second node and the first node, or there may be one or more intermediate devices between the second node and the first node.

S602: The second node receives a BFD packet sent by the first node.

Optionally, after receiving the packet sent by the second node, the first node detects a bit error rate, creates a BFD session between the first node and the second node when the bit error rate exceeds a threshold, and sends the BFD packet to the second node through the BFD session, to notify the second node that a bit error occurs on the packet sent by the second node.

Further, an IP address of the BFD packet is a multicast IP address, or a MAC address of the BFD packet is a multicast MAC address.

Optionally, a diagnostic field of the BFD packet is used to identify that a bit error occurs on the packet sent by the second node to the first node.

S603: The second node sends a packet to the first node through a second tunnel.

Further, after receiving the BFD packet sent by the first node, the second node performs protection switching, that is, sends the packet to the first node through a standby tunnel (that is, the second tunnel), to avoid data traffic loss.

Optionally, after the bit error is eliminated, the second node sends a packet to the first node through the first tunnel again, in other words, data traffic is switched from the second tunnel to the first tunnel.

It should be understood that step S601 to step S603 in the foregoing method embodiment are merely schematic descriptions, and should not constitute any specific limitation. Related steps may be added, deleted, or combined as required.

It should be noted that for specific details in the method embodiment in FIG. 6, refer to related descriptions in S501 to S504. For brevity, details are not described herein again.

To better implement the foregoing solutions of the embodiments of this application, the following further correspondingly provides related apparatuses that are configured to implement the foregoing solutions.

Figure 7:
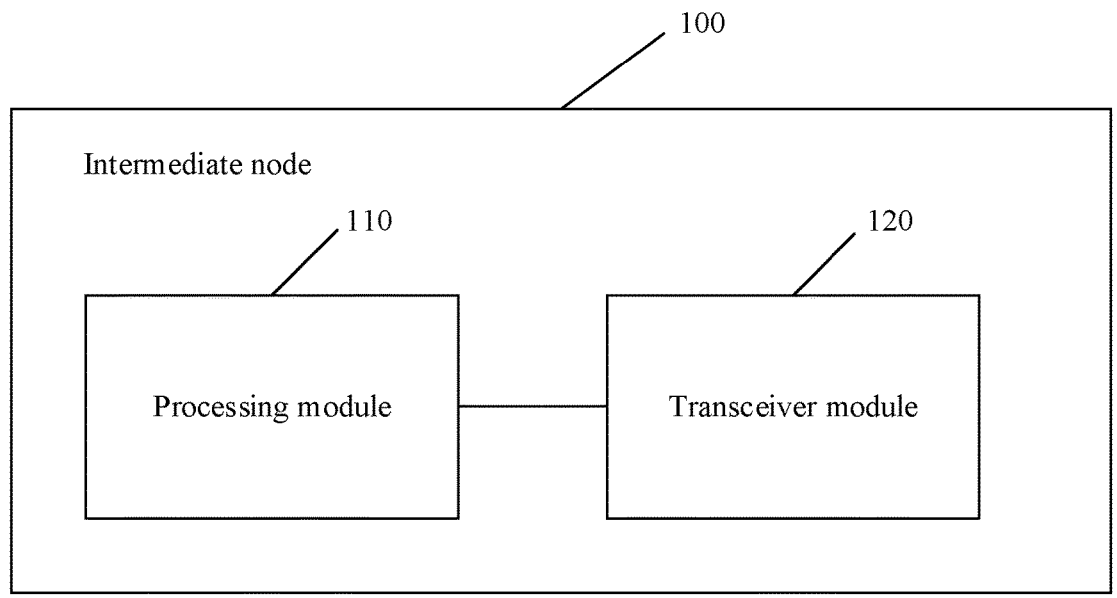
FIG. 7 is a schematic structural diagram of an intermediate node according to an embodiment of this application.

FIG. 7 is a schematic structural diagram of an intermediate node according to an embodiment of this application. As shown in FIG. 7, the intermediate node 100 includes a processing module 110 and a transceiver module 120.

The processing module 110 is configured to detect a bit error rate of a packet that is sent through a first tunnel.

The transceiver module 120 is configured to send a first packet to an egress node on the first tunnel when the processing module 110 detects that the bit error rate exceeds a threshold, where the first packet is used to indicate that a bit error occurs on the first tunnel, the first packet is further used to indicate the egress node to send a second packet to an ingress node on the first tunnel, and the second packet is used to indicate that a bit error occurs on the first tunnel.

In an embodiment, the first packet includes a label and a bit error flag, the label is used by the egress node to determine the first tunnel, and the bit error flag is used to indicate that a bit error occurs on a tunnel through which the first packet is sent.

In an embodiment, the first packet is used to indicate the egress node to send the second packet to the ingress node on the first tunnel through a second tunnel, where the second tunnel is a reverse tunnel of the first tunnel.

In an embodiment, the label is further used by the egress node to determine the second tunnel.

In an embodiment, the processing module 110 calculates a sum of bit error rates of a packet forwarded through a plurality of paths on the first tunnel, and detect that the sum of the bit error rates exceeds the threshold.

In an embodiment, the first packet is a BFD packet, the BFD packet includes a diagnostic field, the diagnostic field is used to carry the bit error flag, and a value of the bit error flag is 30.

In an embodiment, the first packet is a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

It may be understood that the transceiver module 120 in this embodiment of this application may be implemented by a transceiver or a transceiver-related circuit component, and the processing module 110 may be implemented by a processor or a processor-related circuit component.

Figure 8:
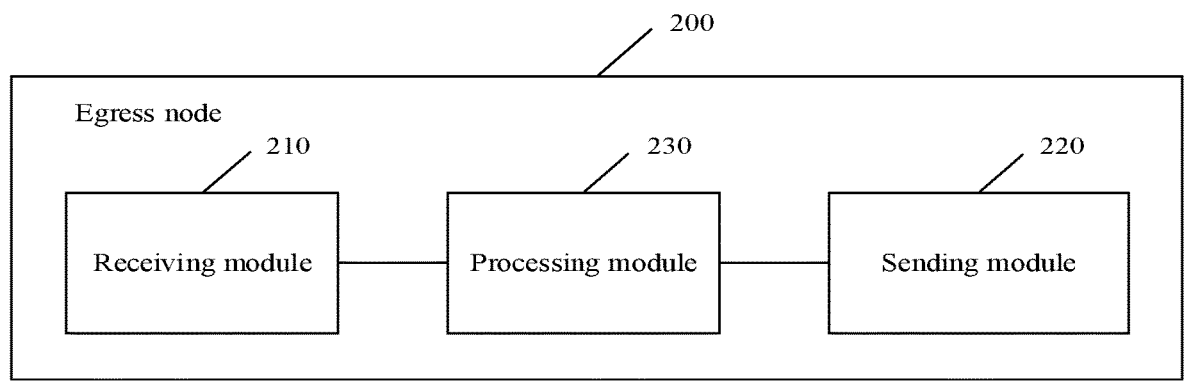
FIG. 8 is a schematic structural diagram of an egress node according to an embodiment of this application.

FIG. 8 is a schematic structural diagram of an egress node according to an embodiment of this application. As shown in FIG. 8, the egress node 200 includes a receiving module 210 and a sending module 220.

The receiving module 210 is configured to receive a first packet sent by a first intermediate node on a first tunnel through the first tunnel, where the first packet is a packet that is sent to the egress node when the first intermediate node detects that a bit error rate of a packet sent through the first tunnel exceeds a threshold, and the first packet is used to indicate that a bit error occurs on the first tunnel.

The sending module 220 is configured to send a second packet to an ingress node on the first tunnel, where the second packet is used to indicate that a bit error occurs on the first tunnel.

In an embodiment, the first packet includes a first label and a first bit error flag, the first label corresponds to the first tunnel, and the first bit error flag is used to indicate that a bit error occurs on a tunnel through which the first packet is sent. The egress node 200 further includes a processing module 230, configured to determine, based on the first label and the first bit error flag, that a bit error occurs on the first tunnel.

In an embodiment, the processing module 230 is further configured to determine a second tunnel based on the first label, and indicate the sending module to send a second packet to the ingress node on the first tunnel through the second tunnel, where the second tunnel is a reverse tunnel of the first tunnel.

In an embodiment, the second packet includes a second label and a second bit error flag, where the second label is used by the ingress node to determine the first tunnel, and the second bit error flag is used to indicate that a bit error occurs on a reverse tunnel of a tunnel through which the second packet is sent.

In an embodiment, the first packet is a BFD packet, the BFD packet includes a diagnostic field, the diagnostic field is used to carry the first bit error flag, and a value of the first bit error flag is 30, and the second packet is a BFD packet, the BFD packet includes a diagnostic field, the diagnostic field is used to carry the second bit error flag, and a value of the second bit error flag is 31.

In an embodiment, the first packet and the second packet each are a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

In an embodiment, the receiving module 210 is further configured to receive a third packet sent by a second intermediate node on the first tunnel through the first tunnel, where the third packet is a packet sent to the egress node when the second intermediate node detects that a bit error rate of a packet sent through the first tunnel exceeds a threshold, the first packet includes a first bit error rate, and the third packet includes a second bit error rate. The processing module 230 is further configured to calculate a sum of the first bit error rate and the second bit error rate, where the sum of the first bit error rate and the second bit error rate exceeds a switching threshold of the egress node.

It may be understood that the receiving module 210 and the sending module 220 in this embodiment of this application may be implemented by a transceiver or a transceiver-related circuit component, and the processing module 230 may be implemented by a processor or a processor-related circuit component.

Figure 9:
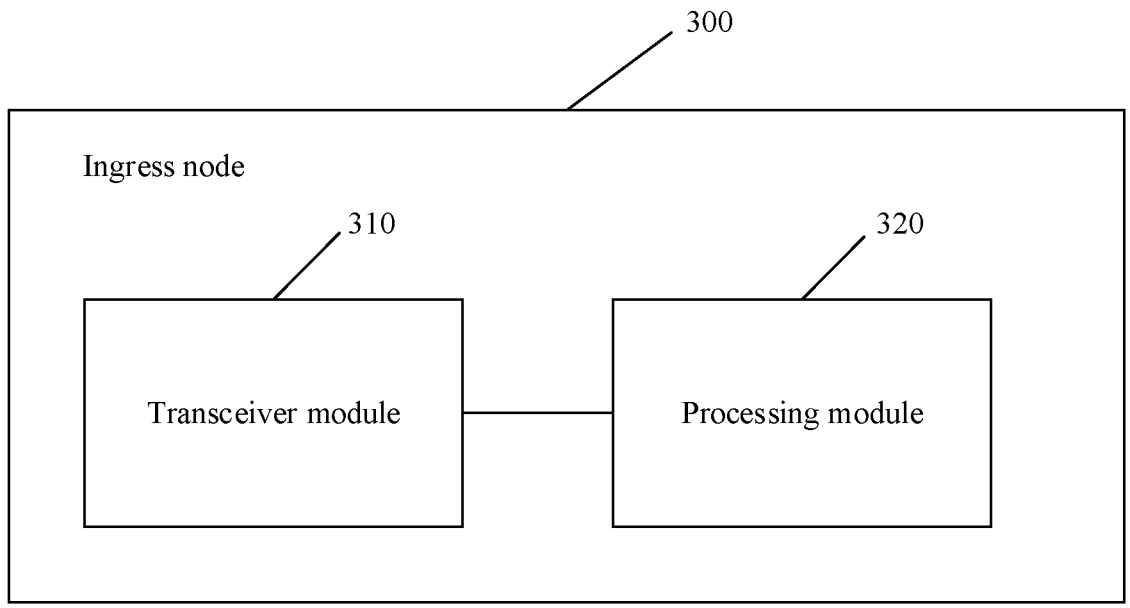
FIG. 9 is a schematic structural diagram of an ingress node according to an embodiment of this application.

FIG. 9 is a schematic structural diagram of an ingress node according to an embodiment of this application. As shown in FIG. 9, the ingress node 300 includes a transceiver module 310 and a processing module 320.

The transceiver module 310 is configured to receive a second packet sent by an egress node on a first tunnel, where the second packet is used to indicate that a bit error occurs on the first tunnel.

The processing module 320 is configured to determine, based on the second packet, that a bit error occurs on the first tunnel.

In an embodiment, the transceiver module 310 is further configured to receive the second packet that is sent by the egress node on the first tunnel through a second tunnel, where the second tunnel is a reverse tunnel of the first tunnel.

In an embodiment, the second packet includes a label and a bit error flag, and the bit error flag is used to indicate that a bit error occurs on a reverse tunnel of a tunnel through which the second packet is sent. The processing module 320 is further configured to determine, based on the label, that a tunnel through which the second packet is sent is the second tunnel, determine that the first tunnel is a reverse tunnel of the second tunnel, and determine, based on the bit error flag, that a bit error occurs on the first tunnel.

In an embodiment, the second packet is a BFD packet, the BFD packet includes a diagnostic field, the diagnostic field is used to carry the bit error flag, and a value of the bit error flag is 31.

In an embodiment, the second packet is a BFD packet, the BFD packet includes a required min echo rx interval field, the required min echo rx interval field is used to carry the bit error rate, the first m bits of the required min echo rx interval field represent a coefficient of the bit error rate, and the middle n bits of the required min echo rx interval field represent an exponent of the bit error rate. m is a positive integer greater than or equal to 1, n is a positive integer greater than or equal to 1, and a sum of m and n is less than a length value of the required min echo rx interval field.

It may be understood that the transceiver module 310 in this embodiment of this application may be implemented by a transceiver or a transceiver-related circuit component, and the processing module 320 may be implemented by a processor or a processor-related circuit component.

It should be noted that the structure of the intermediate node, the structure of the egress node, or the structure of the ingress node, and the process for advertising a bit error are merely examples, and should not constitute any specific limitations. Units in the intermediate node, the egress node, or the ingress node may be added, deleted, or combined as required.

Figure 10:
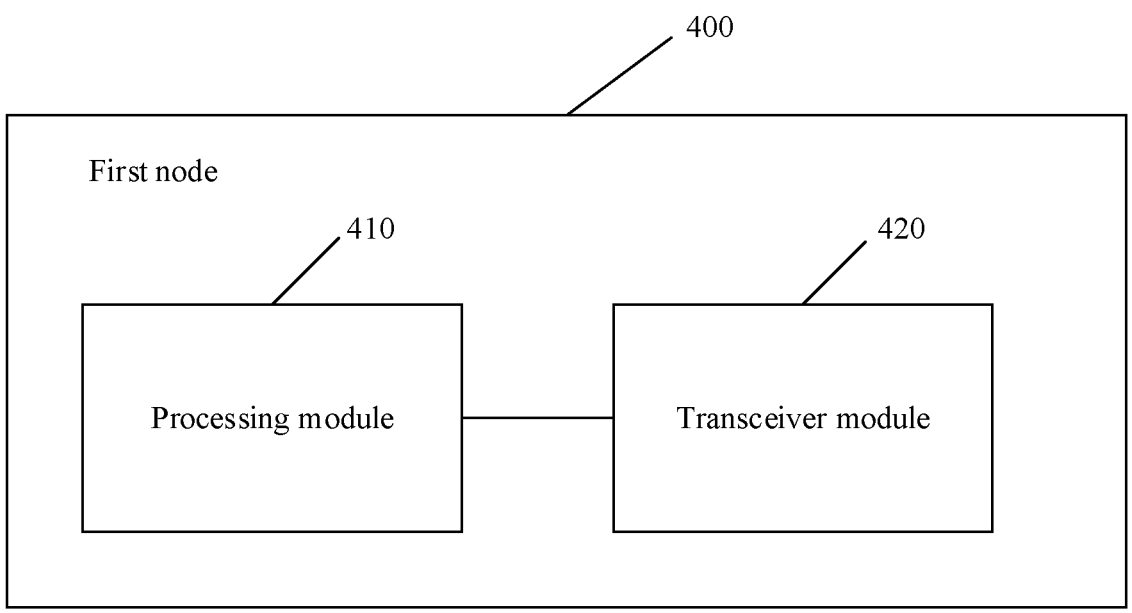
FIG. 10 is a schematic structural diagram of a first node according to an embodiment of this application.

FIG. 10 is a schematic structural diagram of a first node according to an embodiment of this application. As shown in FIG. 10, the first node 400 includes a processing module 410 and a transceiver module 420.

The processing module 410 is configured to detect a bit error rate of a packet received from a second node, and when detecting that the bit error rate reaches a threshold, create a BFD session between the first node and the second node.

The transceiver module 420 is configured to send a BFD packet to the second node through the BFD session, where the BFD packet is used to indicate that a bit error occurs on the packet that is sent by the second node to the first node.

In an embodiment, an IP address of the BFD packet is a multicast IP address, or a MAC address of the BFD packet is a multicast MAC address.

In an embodiment, a diagnostic field of the BFD packet is used to identify that a bit error occurs on the packet that is sent by the second node to the first node.

In an embodiment, the processing module 410 is further configured to when detecting that the bit error rate is less than the threshold, delete the BFD session, and indicate the transceiver module 420 to stop sending a BFD packet to the second node.

It may be understood that the transceiver module 420 in this embodiment of this application may be implemented by a transceiver or a transceiver-related circuit component, and the processing module 410 may be implemented by a processor or a processor-related circuit component.

Figure 11:
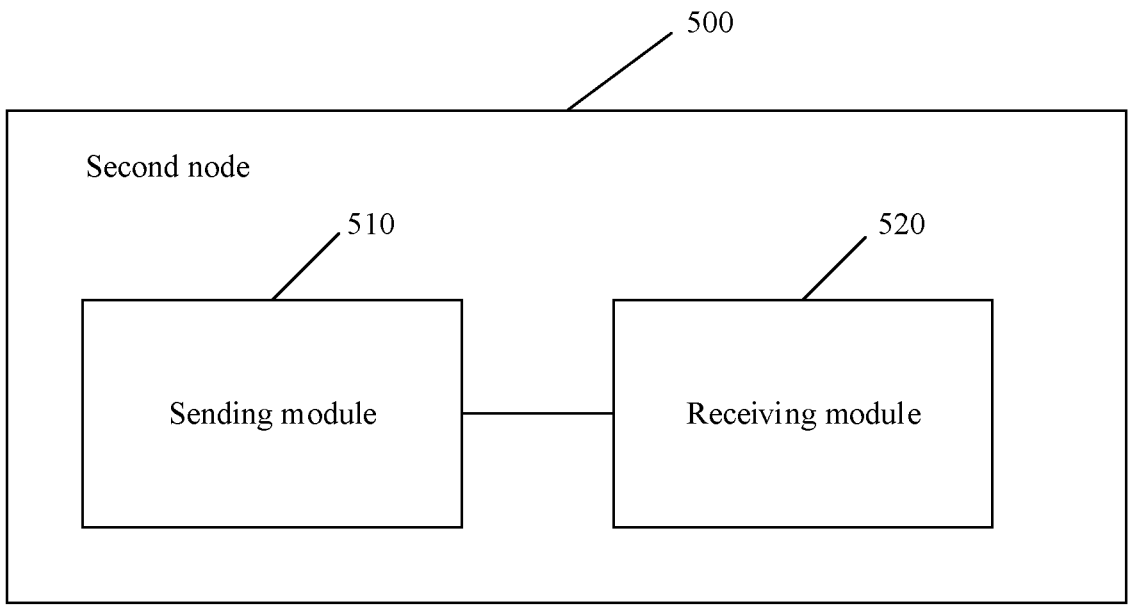
FIG. 11 is a schematic structural diagram of a second node according to an embodiment of this application.

FIG. 11 is a schematic structural diagram of a second node according to an embodiment of this application. As shown in FIG. 11, the second node 500 includes a sending module 510 and a receiving module 520.

The sending module 510 is configured to send a packet to a first node through a first tunnel.

The receiving module 520 is configured to send a BFD packet sent by the first node, where the BFD packet is used to indicate that a bit error occurs on the packet that is sent by the second node to the first node.

The sending module 510 is further configured to send a packet to the first node through a second tunnel, where the second tunnel is different from the first tunnel.

In an embodiment, a diagnostic field of the BFD packet is used to identify that a bit error occurs on the packet that is sent by the second node to the first node.

It may be understood that the sending module 510 and the receiving module 520 in this embodiment of this application may be implemented by a transceiver or a transceiver-related circuit component.

It should be noted that the structure of the first node or the structure of the second node and the process for advertising a bit error are merely examples, and should not constitute any specific limitations. Units in the first node or the second node may be added, deleted, or combined as required.

Figure 12:
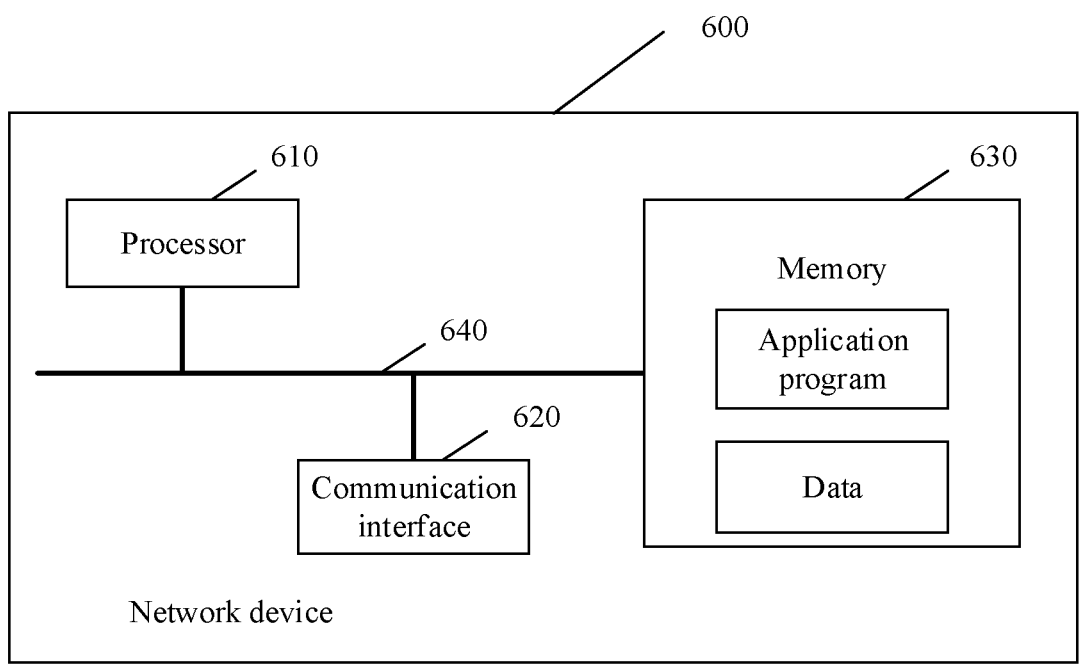
FIG. 12 is a schematic structural diagram of a network device according to an embodiment of this application.

FIG. 12 is a schematic structural diagram of a network device according to an embodiment of this application. As shown in FIG. 12, the network device 600 includes a processor 610, a communication interface 620, and a memory 630. The processor 610, the communication interface 620, and the memory 630 are connected to each other through an internal bus 640. It should be understood that the network device may be a router or a switch.

The processor 610 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

The bus 640 may be a Peripheral Component Interconnect (PCI) bus, an Extended Industry Standard Architecture (EISA) bus, or the like. The bus 640 may be classified as an address bus, a data bus, a control bus, and the like. For ease of representation, only one thick line is used to represent the bus in FIG. 12, but this does not mean that there is only one bus or only one type of bus.

The memory 630 may include a volatile memory such as a RAM, or the memory 630 may include a non-volatile memory such as a ROM, a flash memory, a hard disk drive (HDD), or a solid-state drive (SSD), or the memory 630 may include a combination of the foregoing types. The memory 630 may be configured to store a program and data, so that the processor 610 calls the program code and the data stored in the memory 630, to implement functions of the foregoing processing module. The program code may be a functional module used to implement the intermediate node shown in FIG. 7, the egress node shown in FIG. 8, the ingress node shown in FIG. 9, the first node shown in FIG. 10, or the second node shown in FIG. 11, or is configured to implement the method steps performed by the intermediate node, the egress node, or the ingress node in the method embodiment shown in FIG. 3, the method steps performed by the first node in the method embodiment shown in FIG. 5, and the method steps performed by the second node in the method embodiment shown in FIG. 6.

An embodiment of this application further provides a computer-readable storage medium. The computer-readable storage medium stores a computer program. When the program is executed by a processor, a part of or all of the steps in any one of the foregoing method embodiments can be implemented, and functions of any functional module described in FIG. 7, FIG. 8, FIG. 9, FIG. 10, and FIG. 11.

An embodiment of this application further provides a computer program product. When the computer program product runs on a computer or a processor, the computer or the processor performs one or more steps in any one of the foregoing methods for advertising a bit error. When the foregoing modules in the devices are implemented in a form of a software functional unit and sold or used as an independent product, the modules may be stored in a computer-readable storage medium.

In the foregoing embodiments, the descriptions in the embodiments have respective focuses. For a part that is not described in detail in an embodiment, refer to related descriptions in other embodiments.

It should further be understood that "first", "second", "third", "fourth", and various numbers in this specification are merely used for differentiation for ease of description, and are not construed as any limitation on the scope of this application.

It should be understood that the term "and/or" in this specification describes only an association relationship between associated objects and represents that three relationships may exist. For example, A and/or B may represent the following three cases: only A exists, both A and B exist, and only B exists. In addition, the character "/" in this specification usually indicates an "or" relationship between the associated objects.

It should further be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or partially contribute to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a Universal Serial Bus (USB) flash drive, a removable hard disk, a ROM, a RAM, a magnetic disk, and an optical disc.

A sequence of the steps of the method in the embodiments of this application may be adjusted, combined, or deleted depending on an actual requirement.

The modules in the apparatuses in the embodiments of this application may be combined, divided, or deleted depending on an actual requirement.

In conclusion, the foregoing embodiments are merely intended to describe the technical solutions of this application, but not to limit this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of the embodiments of this application.

What is claimed is:

1. A method implemented by an intermediate node in a first tunnel, wherein the method comprises:
   detecting that a bit error rate of a first packet sent through the first tunnel exceeds a threshold; and
   sending, to an egress node in the first tunnel, through the first tunnel, and in response to the detecting, a second packet indicating that a bit error has occurred in the first tunnel, wherein the second packet instructs the egress node to send, to an ingress node in the first tunnel, a third packet indicating that the bit error has occurred in the first tunnel.

2. The method of claim 1, wherein the second packet comprises:
   a label that enables the egress node to determine the first tunnel; and
   a bit error flag indicating that the bit error has occurred in the first tunnel.

3. The method of claim 2, wherein the second packet is a Bidirectional Forwarding Detection (BFD) packet comprising a diagnostic field, wherein the diagnostic field carries the bit error flag, and wherein a value of the bit error flag is 30.

4. The method of claim 1, wherein the second packet further instructs the egress node to send the third packet to the ingress node through a second tunnel, and wherein the second tunnel is a reverse tunnel of the first tunnel.

5. The method of claim 2, wherein the label further enables the egress node to determine the second tunnel.

6. The method of claim 1, further comprising:
   calculating a sum of bit error rates of a fourth packet forwarded through a plurality of paths in the first tunnel; and
   detecting that the sum exceeds the threshold.

7. The method of claim 1, wherein the second packet is a Bidirectional Forwarding Detection (BFD) packet comprising a required min echo rx interval field, wherein the required min echo rx interval field carries the bit error rate, wherein first m bits of the required min echo rx interval field represent a coefficient of the bit error rate, wherein middle n bits of the required min echo rx interval field represent an exponent of the bit error rate, wherein m is a positive integer greater than or equal to 1, wherein n is a positive integer greater than or equal to 1, and wherein a sum of m and n is less than a length value of the required min echo rx interval field.

8. A method implemented by an egress node in a first tunnel, wherein the method comprises:
   receiving, from a first intermediate node in the first tunnel and through the first tunnel, a first packet when a first bit error rate of a second packet sent through the first tunnel exceeds a first threshold, wherein the first packet indicates that a bit error has occurred in the first tunnel; and
   sending, to an ingress node in the first tunnel and based on the first packet, a third packet indicating that the bit error has occurred in the first tunnel.

9. The method of claim 8, wherein the first packet comprises a first label corresponding to the first tunnel and a first bit error flag indicating that the bit error has occurred in the first tunnel, and wherein the method further comprises determining, based on the first label and the first bit error flag, that the bit error has occurred in the first tunnel.

10. The method of claim 9, further comprising:
determining a second tunnel based on the first label; and
further sending the third packet to the ingress node through the second tunnel, wherein the second tunnel is a reverse tunnel of the first tunnel.

11. The method of claim 8, wherein the third packet comprises:
a second label enabling the ingress node to determine the first tunnel; and
a second bit error flag indicating that the bit error has occurred on a reverse tunnel of a tunnel through which the third packet is sent.

12. The method of claim 9, wherein the first packet is a first Bidirectional Forwarding Detection (BFD) packet comprising a first diagnostic field, wherein the first diagnostic field carries the first bit error flag, wherein a first value of the first bit error flag is 30, wherein the third packet is a second BFD packet comprising a second diagnostic field, wherein the second diagnostic field carries a second bit error flag, and wherein a second value of the second bit error flag is 31.

13. The method of claim 8, wherein each of the first packet and the third packet is a Bidirectional Forwarding Detection (BFD) packet comprising a required min echo rx interval field, wherein the required min echo rx interval field carries the first bit error rate, wherein first m bits of the required min echo rx interval field represent a coefficient of the first bit error rate, wherein middle n bits of the required min echo rx interval field represent an exponent of the first bit error rate, wherein m is a positive integer greater than or equal to 1, wherein n is a positive integer greater than or equal to 1, and wherein a sum of m and n is less than a length value of the required min echo rx interval field.

14. The method of claim 8, further comprising:
receiving, from a second intermediate node in the first tunnel and through the first tunnel, a fourth packet when a second bit error rate of a fifth packet sent through the first tunnel exceeds a second threshold, wherein the first packet comprises the first bit error rate, and wherein the fourth packet comprises the second bit error rate; and
calculating a sum of the first bit error rate and the second bit error rate, wherein the sum exceeds a switching threshold of the egress node.

15. An intermediate node in a first tunnel and comprising:
a memory configured to store instructions; and
a processor coupled to the memory and configured to execute the instructions to cause the intermediate node to:
detect that a bit error rate of a first packet that sent through the first tunnel exceeds a threshold; and
send, to an egress node in the first tunnel, through the first tunnel, and in response to the detecting, a second packet indicating that a bit error has occurred in the first tunnel,
wherein the second packet instructs the egress node to send, to an ingress node in the first tunnel, a third packet indicating that the bit error has occurred in the first tunnel.

16. The intermediate node of claim 15, wherein the second packet comprises:
a label that enables the egress node to determine the first tunnel; and
a bit error flag indicating that the bit error has occurred in the first tunnel.

17. The intermediate node of claim 16, wherein the second packet further instructs the egress node to send the third packet to the ingress node through a second tunnel, and wherein the second tunnel is a reverse tunnel of the first tunnel.

18. An egress node in a first tunnel and comprising:
a memory configured to store instructions; and
a processor coupled to the memory and configured to execute the instructions to cause the egress node to:
receive, from a first intermediate node in the first tunnel and through the first tunnel, a first packet when a bit error rate of a second packet sent through the first tunnel exceeds a threshold, wherein the first packet indicates that a bit error has occurred in the first tunnel; and
send, to an ingress node on the first tunnel, a third packet indicating that the bit error has occurred in the first tunnel.

19. The egress node of claim 18, wherein the first packet comprises a label corresponding to the first tunnel and a bit error flag indicating that the bit error has occurred on the first tunnel, and wherein when executed by the processor, the instructions further cause the egress node to determine, based on the label and the bit error flag, that the bit error has occurred in the first tunnel.

20. The egress node of claim 19, wherein when executed by the processor, the instructions further cause the egress node to:
determine a second tunnel based on the label, wherein the second tunnel is a reverse tunnel of the first tunnel; and
send the third packet to the ingress node through the second tunnel.

* * * * *